(12) United States Patent
Imbach et al.

(10) Patent No.: US 12,229,798 B2
(45) Date of Patent: Feb. 18, 2025

(54) SYSTEM AND METHOD FOR INDIVIDUALIZED EXPOSURE ESTIMATION IN LINEAR MEDIA ADVERTISING FOR CROSS PLATFORM AUDIENCE MANAGEMENT AND OTHER APPLICATIONS

(71) Applicant: datafuelX Inc., Chappaqua, NY (US)

(72) Inventors: Bradley Imbach, Roswell, GA (US); Wassim Chaar, Coppell, TX (US); Howard Shimmel, Wilton, CT (US); Daniel Aversano, Huntington, NY (US)

(73) Assignee: datafuelX Inc., Chappaqua, NY (US)

(*) Notice: Subject to any disclaimer, the term of this patent is extended or adjusted under 35 U.S.C. 154(b) by 0 days.

(21) Appl. No.: 17/938,127

(22) Filed: Oct. 5, 2022

(65) Prior Publication Data
US 2023/0110511 A1    Apr. 13, 2023

Related U.S. Application Data

(60) Provisional application No. 63/253,331, filed on Oct. 7, 2021.

(51) Int. Cl.
*G06Q 30/00* (2023.01)
*G06Q 30/0242* (2023.01)

(52) U.S. Cl.
CPC .................. *G06Q 30/0244* (2013.01)

(58) Field of Classification Search
None
See application file for complete search history.

(56) References Cited

U.S. PATENT DOCUMENTS

| | | |
|---|---|---|
| 9,147,198 B2 | 9/2015 | Emans et al. |
| 9,344,749 B2 | 5/2016 | Hoctor et al. |
| 9,485,528 B2 | 11/2016 | Hoctor et al. |
| 9,525,899 B2 | 12/2016 | Hoctor et al. |
| 9,854,327 B2 | 12/2017 | Emans et al. |

(Continued)

FOREIGN PATENT DOCUMENTS

| | | | | |
|---|---|---|---|---|
| CA | 3046341 A1 | * | 6/2018 | ............. H04H 20/42 |
| WO | WO-2020234860 A1 | * | 11/2020 | ......... G06Q 30/0242 |

OTHER PUBLICATIONS

Panaggio, Mark J., et al. "Prediction and optimal scheduling of advertisements in linear television." arXiv preprint arXiv:1608.07305 (2016). (Year: 2016).*

(Continued)

*Primary Examiner* — Michael Bekerman
(74) *Attorney, Agent, or Firm* — Maginot, Moore & Beck, LLP

(57) ABSTRACT

A system and method for advertisement exposure forecasting are described herein, which advantageously provide viewer-level advertisement exposure forecasting for linear media platforms. Based on historical viewing data, a viewing proportion estimation model is trained for each of a plurality of viewers/devices. A plurality of viewing proportions is determined with respect to a plurality of future programs for each of the plurality of viewers/devices. Based on the plurality of viewing proportions, a reach and frequency of an advertising campaign are determined based on advertisement spot counts for each future program that is involved in the advertising campaign.

19 Claims, 20 Drawing Sheets

(56) References Cited

U.S. PATENT DOCUMENTS

| | | | |
|---|---|---|---|
| 10,136,170 B2 | 11/2018 | Meyer et al. | |
| 10,165,315 B2* | 12/2018 | Epstein | H04N 21/25891 |
| 10,327,019 B2 | 6/2019 | Hoctor et al. | |
| 11,030,646 B1* | 6/2021 | Roy | G06N 20/20 |
| 11,330,314 B2 | 5/2022 | Hoctor et al. | |
| 2007/0162926 A1* | 7/2007 | Steelberg | H04N 21/25891 |
| | | | 725/35 |
| 2008/0263578 A1* | 10/2008 | Bayer | G06Q 30/02 |
| | | | 725/23 |
| 2011/0185382 A2* | 7/2011 | Hawkins | H04N 21/25891 |
| | | | 725/34 |
| 2011/0289524 A1* | 11/2011 | Toner | H04N 21/44204 |
| | | | 725/9 |
| 2015/0373387 A1* | 12/2015 | Chaar | H04N 21/2547 |
| | | | 725/35 |
| 2016/0105699 A1* | 4/2016 | Luzzi | H04N 21/252 |
| | | | 725/14 |
| 2017/0034593 A1* | 2/2017 | Ray | H04N 21/812 |
| 2017/0064365 A1* | 3/2017 | Chaar | H04N 21/25883 |
| 2017/0124589 A1* | 5/2017 | Chaar | G06Q 30/0273 |
| 2017/0127110 A1* | 5/2017 | Chaar | H04H 60/31 |
| 2017/0155956 A1* | 6/2017 | Nagaraja Rao | H04N 21/44226 |
| 2019/0080365 A1* | 3/2019 | Chaar | G06Q 30/0247 |
| 2022/0114472 A1* | 4/2022 | Davies | H04N 21/251 |
| 2022/0122098 A1* | 4/2022 | Aberman | G06Q 30/0201 |
| 2023/0014859 A1* | 1/2023 | Kitts | H04N 21/44204 |
| 2023/0063587 A1* | 3/2023 | Pagtakhan | G06F 16/24578 |

OTHER PUBLICATIONS

Mahlen, Joar, and Alexander Olsson. "Predicting television advertisement reach with machine learning models." (2022). (Year: 2022).*

Hassell, Jackson. Using Supervised Learning Techniques to Predict Television Ratings. Diss. 2020. (Year: 2020).*

* cited by examiner

420

| AIRING_ID | NETWORK | BROADCASTDATE | PROGRAM_NAME | EPISODE_NAME |
|---|---|---|---|---|
| 1 | e551aa6a30c0 | GSN | 3/19/21 | CATCH 21 | |
| 2 | a324bc6bc215 | DSNY | 2/22/21 | RAVENS HOME - LN | SLAMMED |
| 3 | 261d9055f1cb | CMDY | 10/2/20 | OFFICE, THE | OFFICE-626 |

| | REPORTED_START_TIMESTAMP | REPORTED_DURATION | IS_REPEAT | IS_SPECIAL | GENRE |
|---|---|---|---|---|---|
| 1 | 14:30:00 | 30 | TRUE | FALSE | QG/QG |
| 2 | 1:00:00 | 30 | TRUE | FALSE | C/KS |
| 3 | 18:00:00 | 30 | TRUE | FALSE | CS/CS |

FIG. 5

| AIRING_ID | HOUSEHOLD_ID | VIEWING_WEIGHT | TARGET_VIEWING_MINUTES | TARGET_VIEWING_PROPORTION |
|---|---|---|---|---|
| 633b2e40127c | a48e87f7a491 | 4204 | 1 | 0.007937 |
| a45fb7cf1eaf | 48c35d76cfde | 2943 | 4 | 0.133333 |
| c0e083b86c95 | 9cfba4a60822 | 7993 | 1 | 0.016667 |
| 66ecb1ac5de5 | b47aeb11cd7a | 5487 | 30 | 1 |

|  | Feature Name | 1 |
|---|---|---|
| Reference | broadcastweekstartdate | 8/30/21 |
| Reference | program_id | e7b36ec21cc |
| Reference | household_id | 0a2edf423e0 |
|  |  |  |
| Program Attribute | hour3_of_week | 42 |
| Program Attribute | position_in_year | 0.687671233 |
| Program Attribute | time_series | 21.68767123 |
| Program Attribute | is_repeat | 1 |
| Program Attribute | genre_soap | 108000 |
| Program Attribute | genre_soccer | 0 |
| Program Attribute | genre_sitcom | 0 |
| Program Attribute | genre_comedy | 108000 |
| Program Attribute | genre_... | 0 |
| Program Attribute | program_type_kids | 108000 |
| Program Attribute | program_type_movie | 0 |
| Program Attribute | program_type_news | 0 |
| Program Attribute | program_type_... | 0 |
| Program Attribute | content_id_01a0cf073561eb6113f2f4748fd110e4 | 0 |
| Program Attribute | content_id_3afb59756f2c0d2e9c20729c44790e87 | 108000 |
| Program Attribute | content_id_3bf9b7ff4eddd98035d9af3f651209da | 0 |
| Program Attribute | content_id_... | 0 |

| | Feature Name | 1 |
|---|---|---|
| Reference | broadcastweekstartdate | 8/30/21 |
| Reference | program_id | e7b36ec21cc |
| Reference | household_id | 0a2edf423e0 |
| | | ← 450 |
| Forecasting Period | gap_weeks | 12 |
| Viewer Attribute | hour3_of_week_1 | 0.000306268 |
| Viewer Attribute | hour3_of_week_2 | 0.004672365 |
| Viewer Attribute | hour3_of_week_3 | 0.028247863 |
| Viewer Attribute | hour3_of_week_... | 0.028247863 |
| Viewer Attribute | viewing_program_type_paid_programming | 0 |
| Viewer Attribute | viewing_program_type_news | 0.000212357 |
| Viewer Attribute | viewing_program_type_sports_event | 5.19782E-05 |
| Viewer Attribute | viewing_program_type_special | 0.001212963 |
| Viewer Attribute | viewing_program_type_... | 0.001212963 |
| Viewer Attribute | viewing_content_id_f6706462c8d551549e940ce7364f19ef | 0 |
| Viewer Attribute | viewing_content_id_aed4dd1cdf8a1208e97171d3cf70cdf0 | 0.000117511 |
| Viewer Attribute | viewing_content_id_e599bb20073f8b5a09b5c8214fd11059 | 0.000101057 |
| Viewer Attribute | viewing_content_id_9277fb9c030702cef9f957d7c1f2d2a6 | 2.53669E-05 |
| Viewer Attribute | viewing_content_id_... | 0 |
| Viewer Attribute | viewing_genre_soap | 0.000391257 |
| Viewer Attribute | viewing_genre_soccer | 5.41203E-05 |
| Viewer Attribute | viewing_genre_news | 0.000159649 |
| Viewer Attribute | viewing_genre_sitcom | 3.2078E-05 |
| Viewer Attribute | viewing_genre_... | 7.89016E-05 |
| Viewer Attribute | viewing_recency_weeks | 0 |
| Dependent Variable | viewing_proportion | 0.12 |

| TARGET AIRING ID | HOUSEHOLD ID | ESTIMATED VIEWING PROPORTION |
|---|---|---|
| de0e30ab0ddf | b47aeb11cd7a | 0.0074 |
| 0e81b1c0488a | 10a569b8dbfc | 0.6812 |

FIG. 12A

|  | Program 1 | Program 2 | Program 3 | Program 4 | Program 5 |
|---|---|---|---|---|---|
| Viewer 1 | 0.0 | 0.0 | .05 | .65 | 0.0 |
| Viewer 2 | 0.0 | .03 | .09 | 0.0 | 0.0 |
| Viewer 3 | .32 | 0.0 | 0.0 | 0.0 | 0.0 |
| Viewer 4 | 0.0 | 0.0 | 0.0 | .064 | .02 |

FIG. 12B

| SELLING_TITLE | TARGET_AIRING_ID | TARGET_AIRING_DURATION | HOUSEHOLD_ID | ESTIMATED_VIEWING_PROPORTION |
|---|---|---|---|---|
| Selling Title 1 | de0e30ab0ddf | 30 | b47aeb11cd7a | 0.0074 |
| Selling Title 1 | 0e81b1c0488a | 120 | b47aeb11cd7a | 0.0 |

FIG. 13A

| | Selling Title 1 | Selling Title 2 | Selling Title 3 | Selling Title 4 | Selling Title 5 |
|---|---|---|---|---|---|
| Viewer 1 | 0.0 | 0.0 | .05 | .65 | 0.0 |
| Viewer 2 | 0.0 | .03 | .09 | 0.0 | 0.0 |
| Viewer 3 | .32 | 0.0 | 0.0 | 0.0 | 0.0 |
| Viewer 4 | 0.0 | 0.0 | 0.0 | .064 | .02 |

FIG. 13B

| | Program 1 | Program 2 | Program 3 | Program 4 | Program 5 |
|---|---|---|---|---|---|
| Spots | 1 | 4 | 12 | 7 | 11 |

FIG. 14A

| | Selling Title 1 | Selling Title 2 | Selling Title 3 | Selling Title 4 | Selling Title 5 |
|---|---|---|---|---|---|
| Spots | 1 | 4 | 12 | 7 | 11 |

FIG. 14B

| WEEK | HOUSEHOLD_ID | REACH_PROBABILITY | ESTIMATED_EXPOSURES |
|---|---|---|---|
| 2 | dbf2f282f46d | 0.004 | 0 |
| 2 | 3f83dfc451af | 0.743 | 2 |
| 2 | 8939d7193373 | 0.965 | 8 |

|  | Selling Title 1 | Selling Title 2 | Selling Title 3 |
|---|---|---|---|
| Selling Title 1 | 1.0 | .04 | .76 |
| Selling Title 2 | .04 | 1.0 | .32 |
| Selling Title 3 | .76 | .32 | 1.0 |

| Network | Airing Datetime | Measured Lift in Site Visits |
|---|---|---|
| ABC | 2021-03-19 19:34:00 | +.08% |
| SYFY | 2021-07-22 18:36:00 | +.004% |

| Network | Airing Datetime | Audience Size | Proportion Male | Proportion Income 30K - 50K | Proportion Income 50K-80K | ... |
|---|---|---|---|---|---|---|
| ABC | 2021-03-19 19:34:00 | 105,667 | .35 | .13 | .18 | ... |
| SYFY | 2021-07-22 18:36:00 | 45,667 | .73 | .08 | .11 | ... |

| Gender | Age | Income | Baseline Propensity | Ad Exposures | Observed Conversion | Conversion Lift |
|---|---|---|---|---|---|---|
| M | 22 | 93K | .003 | 0 | 0 | 0.0 |
| F | 48 | 64K | .013 | 3 | 1 | 76.92 |

| SELLING_TITLE | TARGET_AIRING_ID | ESTIMATED_ADDITIONAL_CONVERSIONS |
|---|---|---|
| Selling Title 1 | de0e30ab0ddf | 2,983 |
| Selling Title 1 | 0e81b1c0488a | 874 |

FIG. 20D

SYSTEM AND METHOD FOR INDIVIDUALIZED EXPOSURE ESTIMATION IN LINEAR MEDIA ADVERTISING FOR CROSS PLATFORM AUDIENCE MANAGEMENT AND OTHER APPLICATIONS

This application claims the benefit of priority of U.S. provisional application Ser. No. 63/253,331, filed on Oct. 7, 2021 the disclosure of which is herein incorporated by reference in its entirety.

FIELD

The device and method disclosed in this document relates to advertising technology and, more particularly, to individualized exposure estimation in linear media advertising.

BACKGROUND

Unless otherwise indicated herein, the materials described in this section are not admitted to be the prior art by inclusion in this section.

An advertising campaign generally seeks to reach a specific segment of the population with various related messages within a defined date range. To this end, advertisers generally work with their partner marketing agencies to generate various creative media relating to the desired messaging including video commercials for television or online video platforms, audio commercials for radio or podcasts, display ads for the Internet, and image advertisements for billboards, magazines, newspapers, or the like. In general, media planners and buyers seek to maximize reach, or the total number of target persons exposed, while aiming for an ideal frequency, or total number of exposures, for each person reached. One concern of campaign planning across media is the prospect of over-exposing certain persons in their target audience while under-exposing other persons in their target audience.

With respect to linear television advertising, advertisers generally buy commercial advertising time from broadcast and cable television networks in advance and will negotiate which networks or stations, which times of day, which days of the week, and which specific programming within which their advertisements will air in. However, due to the nature of linear television, all viewers watching a linear television program at the same time see the same advertisements. As a result, television networks often cannot provide guarantees or accurate forecasts with respect to which individual viewers or devices will be exposed to an advertisement during an advertising campaign. This presents a challenge for advertising campaign planners with respect to over-exposing and under-exposing various persons in their target audience.

This challenge is further complicated when advertisers buy advertising time or advertisement exposures on a variety of different platforms including linear television and digital platforms. Particularly, digital advertisement delivery platforms, such those provided by streaming content providers, are generally capable of programmatically serving advertisements to individual viewers via digital advertisement insertion. Thus, many digital advertisement delivery platforms are capable of accurately forecasting, and indeed controlling for, which individual viewers or devices will be exposed to an advertisement. However, due to the divergent capabilities of linear television compared to digital advertisement delivery platforms, it is nonetheless quite challenging to control for advertisement exposures in a viewer-specific manner across these different platforms. Thus, the challenges with respect to over-exposing and under-exposing various persons in a target audience can further complicated when using multiple different advertising platforms.

Accordingly, what is needed is a method and system overcome the technical limitations of linear television advertising and provides accurate viewer-specific forecasting of advertisement exposure on linear television networks.

SUMMARY

A method for forecasting advertisement exposure is described. The method comprises receiving, with a processor, information detailing a plurality of future linear media programs and information detailing a plurality of advertisement spots to be aired during the plurality of future linear media programs. The method further comprises determining, with the processor, a plurality of predicted proportions of the plurality of future linear media programs that will be viewed by at least one viewer, using at least one model and based on the information detailing the plurality of future linear media programs. The method further comprises determining, with the processor, whether the at least one viewer will be exposed to at least one of the plurality of advertisement spots based on (i) the plurality of predicted proportions and (ii) the information detailing the plurality of advertisement spots.

BRIEF DESCRIPTION OF THE DRAWINGS

The foregoing aspects and other features of the system and method are explained in the following description, taken in connection with the accompanying drawings.

FIG. 5 shows exemplary values of "program airings" data.

FIG. 6 shows exemplary values of "programming viewing" data.

FIG. 7 shows exemplary values of "program feature vectors" data.

FIG. 8 shows exemplary values of "identity viewing feature vectors" data.

FIG. 12A shows exemplary output data of a viewing proportion estimation model.

FIG. 12B shows exemplary program viewing proportions.

FIG. 13A shows exemplary data for selling title aggregation.

FIG. 13B shows a table of exemplary selling title viewing proportions.

FIG. 14A shows exemplary spot counts for exemplary programs.

FIG. 14B shows exemplary spot counts for exemplary selling titles.

FIG. 15 shows a table of exemplary output data of the reach and frequency statistical model.

FIG. 18 shows a table of exemplary selling title audience overlaps values.

FIG. 20A shows a table of exemplary historical spot attribution data.

FIG. 20B shows a table of exemplary audience volume and audience composition data mapped onto individual advertisement spot airings.

FIG. 20C shows a table of exemplary historical spot attribution data which includes viewer-level attribution information.

FIG. 20D shows a table of exemplary output data indicating estimated additional conversions for target future program airings.

DETAILED DESCRIPTION

Figure 1:
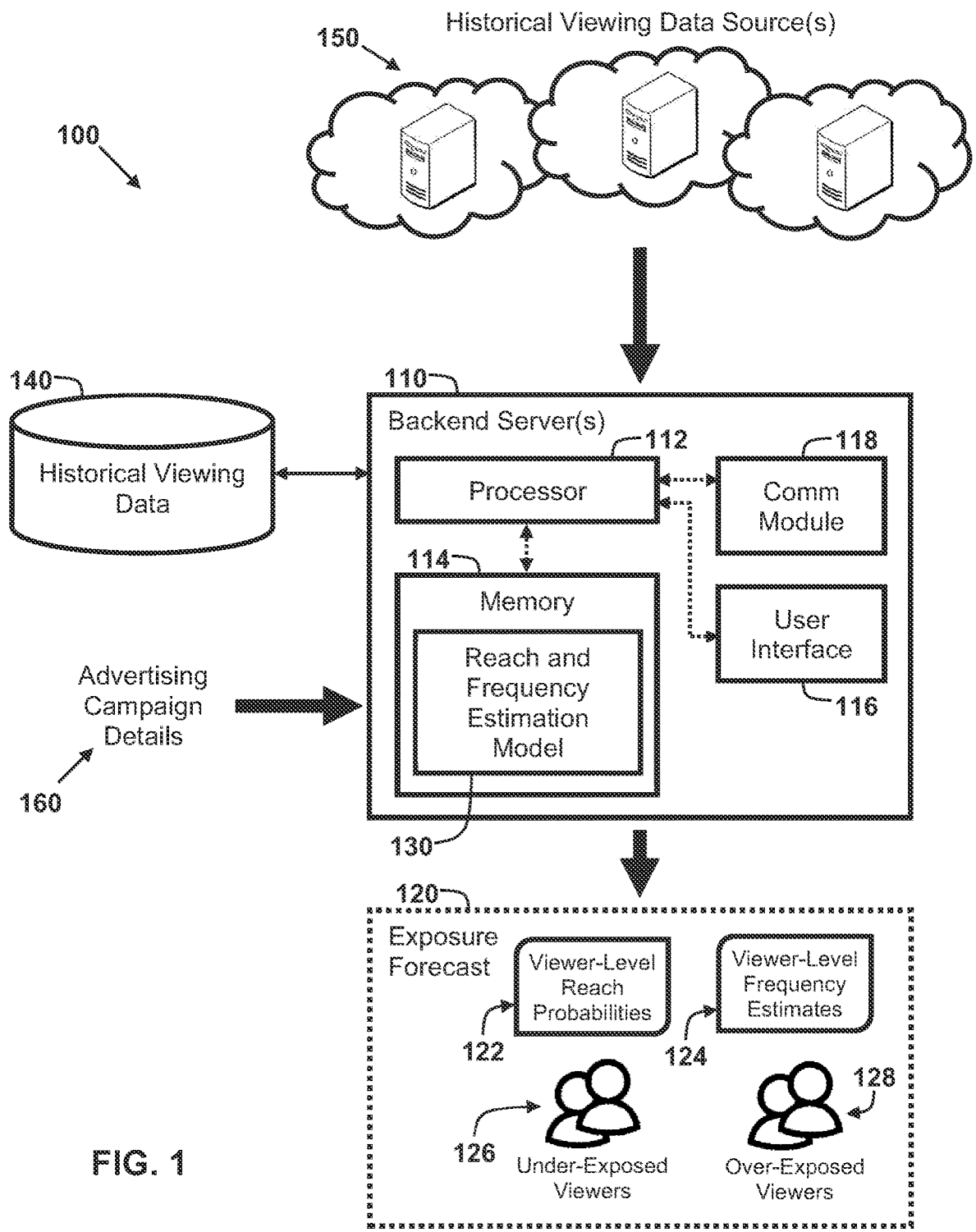
FIG. 1 shows an advertisement exposure forecasting system.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

System Overview

FIG. 1 shows an advertisement exposure forecasting system 100. The advertisement exposure forecasting system 100 is advantageously configured to provide viewer-level advertisement exposure forecasting for linear media platforms. In this way, the advertisement exposure forecasting system 100 overcomes the technological limitations of linear media platforms and helps advertisers increase the reach of their advertising campaigns, while improving control of exposure frequency across linear media and over-the-top media platforms.

As used herein, "linear media" refers to media in which viewers (or listeners) can only watch (or listen to) media content according to a programming schedule of the media broadcaster. Two primary examples of such linear media include broadcast-style linear television and linear radio. Generally, linear media platforms broadcast their media to an audience in such a manner that all viewers (or listeners) will be exposed to the same advertisements. As will be appreciated by those of ordinary skill in the art, linear media is in contrast with over-the-top (OTT) media, in which content is delivered on-demand in a streaming format, generally via the Internet. Generally, OTT media platforms stream their media to viewers (or listeners) on an individual basis such that individual viewers (or listeners) can be exposed to different advertisements in a controlled manner. Additionally, as used herein, the term "view" refers to consuming media content of any kind (e.g., by watching, listening, looking at, or similar). Likewise, as used herein, the term "viewer" or "viewing identity" should be understood to include any person consuming media content of any kind or any device that receives media content to be consumed by one or more persons. As used herein a "program" refers to an individual piece of media content during which an advertisement can be aired.

The advertisement exposure forecasting system 100 comprises at least one backend server 110 (or other suitable computing device) configured to generate an exposure forecast 120 using a reach and frequency estimation model 130. The exposure forecast 120 at least comprises viewer-level reach probabilities 122 and viewer-level frequency estimates 124, with respect to a linear media portion of an advertising campaign. As used herein, when applied to an individual viewer, the term "reach" refers to whether the individual viewer will be exposed to an advertisement at least once within a defined time period, and the term "frequency" refers to how many times the individual viewer will be exposed to the advertisement within the defined time period. Similarly, as used herein, when applied to a group of viewers, the term "reach" refers to how many viewers in the group of viewers will be exposed to an advertisement at least once, and the term "frequency" refers to an average number of times that the viewers in the group of viewers will be exposed to the advertisement.

In addition to the viewer-level reach and frequency estimates, the exposure forecast 120 advantageously further identifies one or both of (i) a subset of under-exposed viewers 126 and (ii) a subset of over-exposed viewers 128, with respect to a linear media portion of an advertising campaign. Based on this information, advertisers can compensate for under-exposure and over-exposure in the linear media portion of the advertising campaign using alternate advertising platforms, such as OTT media platforms, which allow for individualized control of advertisement exposure.

At least some components of the reach and frequency estimation model 130 consist of machine learning models which are trained based on historical viewing data 140 for a plurality of viewers (i.e., a universe of possible viewers). The historical viewing data 140 can be obtained in a variety of manners from a variety of different historical viewing data sources 150 (e.g., smart TV data, panel viewing data, etc.).

Once the reach and frequency estimation model 130 is trained on the historical viewing data 140 for the plurality of viewers, the advertisement exposure forecasting system 100 is configured to utilize the reach and frequency estimation model 130 to generate the exposure forecast 120 with respect to the linear media portion of a planned advertising campaign. To this end, the advertisement exposure forecasting system 100 receives planned advertising campaign details 160 which describe at least the linear media portion of the planned advertising campaign. In at least one embodiment, the planned advertising campaign details 160 include a linear media schedule detailing when and during which future programs advertisements will be aired including, for example, (1) how many advertisements will air by network, (2) the times of day that those advertisements will air, and (3) the particular programs or types of programs during which the advertisements will air, over the course of the campaign flight dates. The linear media schedule may take the form of a calendar grid that details this information for particular increments of time, such as on a weekly basis. These individual ad airings are usually referred to as "advertisement spots" or, simply, "spots."

Once the exposure forecast 120 is generated, the advertisement exposure forecasting system 100 compares the forecasted reach and frequency of the planned advertising campaign with the target audience for the planned advertising campaign. It should be appreciated that the target audience may be a subset of the plurality of viewers for which historical viewing data 140 is kept and for which the reach and frequency estimation model 130 is trained. The advertisement exposure forecasting system 100 identifies the subsets of under-exposed viewers 126 and over-exposed viewers 128 within the target audience based on the forecasted reach and frequency of the planned advertising campaign.

The under-exposed viewers 126 include any viewers that are within the target audience but are not expected to be reached or are not expected to be exposed enough times by the planned advertising campaign. Once identified, the remainder subset of under-exposed viewers 126 can be can be targeted on other platforms that are able to serve ads to specific individuals, such as OTT media platforms. Likewise, the over-exposed viewers 128 include any viewers are expected to be exposed too many times by the planned advertising campaign. The over-exposed viewers 128 can be suppressed on the other platforms. Likewise, if the subset of over-exposed viewers 128 is too large, the planned advertising campaign can be adjusted.

The advertisement exposure forecasting system 100 may incorporate a web-interface or equivalent mechanism (e.g., file sharing or email-based output reporting) to provide the exposure forecast 120 to a client advertiser or client advertising platform. The web-interface or equivalent may also provide recommendations for adjusting the planned advertising campaign. In some embodiments, the advertisement exposure forecasting system 100 may optionally execute supplemental purchases of advertising time or advertisement exposures purchases on behalf of a client advertiser, based on those recommendations.

The exposure forecasting process can be repeated during the flight of the linear media schedule. As advertisements are aired during the advertising campaign, updated historical viewing data 140 is received and the advertisement exposure forecasting system 100 integrates these actual advertisement exposures into the exposure forecast 120. Thus, these actual advertisement exposures can be used to refine the subsets of under-exposed viewers 126 and over-exposed viewers 128. In this way, the exposure forecast 120 and the included metrics can be generated at any time and as often as needed between the pre-flight period, during the flight, or after the flight of the linear media schedule.

With continue reference to FIG. 1, exemplary components and features of the at least one backend server 110 (or another suitable computing device) are described. The backend server(s) 110 include one or more servers configured to serve a variety of functions for the advertisement exposure forecasting system 100, at least including generating the exposure forecast 120 and managing the database of historical viewing data 140 collected from the historical viewing data source(s) 150. In some embodiments, the backend server(s) 110 may also include various web servers or application servers depending on the features and functionalities provided by the advertisement exposure forecasting system 100.

In the illustrated embodiment, a single backend server 110 is shown, which includes a processor 112, a memory 114, a user interface 116, and a network communications module 118. However, any number of backend servers 110 can be utilized to enable the described functionalities. Moreover, these exemplary components are merely representative of any of various manners or configurations of a server or any other data processing systems that are operative in the manner set forth herein.

The processor 112 is configured to execute instructions to operate the backend server 110 to enable the features, functionality, characteristics and/or the like as described herein. To this end, the processor 112 is operably connected to the memory 114, the user interface 116, and the network communications module 118. The processor 112 generally comprises one or more processors which may operate in parallel or otherwise in concert with one another. It will be recognized by those of ordinary skill in the art that a "processor" includes any hardware system, hardware mechanism or hardware component that processes data, signals or other information. Accordingly, the processor 112 may include a system with a central processing unit, graphics processing units, multiple processing units, dedicated circuitry for achieving functionality, programmable logic, or other processing systems.

The memory 114 is configured to store program instructions that, when executed by the processor 112, enable the backend server 110 to perform various operations described herein, including generating the exposure forecast 120 and managing the database of historical viewing data 140. Particularly, the memory 114 stores programs instructions corresponding to the reach and frequency estimation model 130. The memory 114 may be of any type of device or combination of devices capable of storing information accessible by the processor 112, such as memory cards, ROM, RAM, hard drives, discs, flash memory, or any of various other computer-readable media recognized by those of ordinary skill in the art.

The network communications module 118 of the backend server 110 provides an interface that allows for communication with any of various device. In particular, the network communications module 118 may include a local area network port that allows for communication with any of various local computers housed in the same or nearby facility. Generally, the backend server 110 communicates with remote computers over the Internet via a separate modem and/or router of the local area network. Alternatively, the network communications module 118 may further include a wide area network port that allows for communications over the Internet. In one embodiment, the network communications module 118 is equipped with a Wi-Fi transceiver or other wireless communications device. Accordingly, it will be appreciated that communications with the backend server 110 may occur via wired communications or via the wireless communications and may be accomplished using any of various known communications protocols.

The backend server 110 may be operated locally or remotely by an administrator. To facilitate local operation, the backend server 110 may include a user interface 116. In at least one embodiment, the user interface 116 may suitably include an LCD display screen or the like, a mouse or other pointing device, a keyboard or other keypad, speakers, and a microphone, as will be recognized by those of ordinary skill in the art. Alternatively, in some embodiments, an administrator may operate the backend server 110 remotely from another computing device which is in communication therewith via the network communications module 118 and has an analogous user interface.

Methods for Exposure Forecasting in Linear Media Advertising

A variety of methods and processes are described below for operating the advertisement exposure forecasting system 100 and/or the backend server 110. In these descriptions, statements that a method, processor, and/or system is performing some task or function refers to a controller or processor (e.g., the processor 112 of the backend server 110)

executing programmed instructions stored in non-transitory computer readable storage media (e.g., the memory 114 of the backend server 110) operatively connected to the controller or processor to manipulate data or to operate one or more components in the advertisement exposure forecasting system 100 to perform the task or function. Additionally, the steps of the methods may be performed in any feasible chronological order, regardless of the order shown in the figures or the order in which the steps are described.

Figure 2:
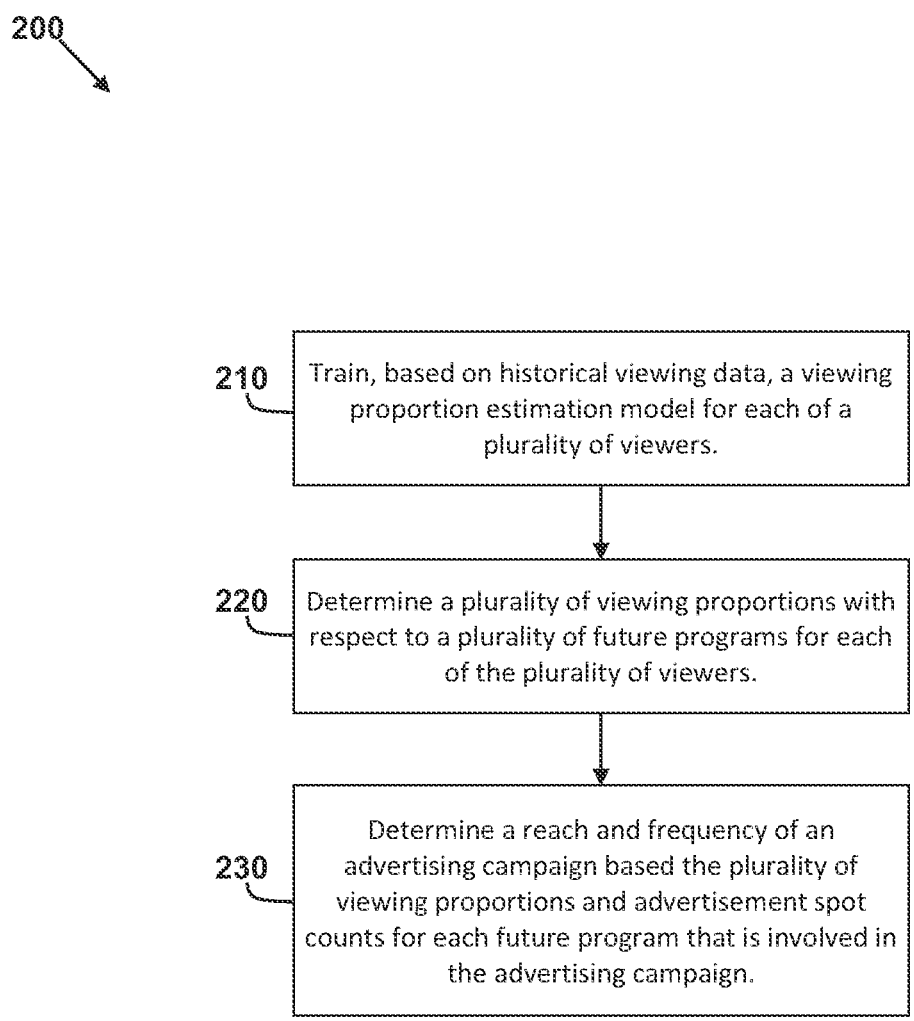
FIG. 2 shows a method for exposure forecasting in linear media advertising.

FIG. 2 shows a method 200 for exposure forecasting in linear media advertising. The method 200 advantageously enables viewer-level advertisement exposure forecasting for linear media platforms. In this way, the method 200 overcomes the technological limitations of linear media platforms and helps advertisers increase the reach of their advertising campaigns, while improving control of exposure frequency across linear media and OTT media platforms.

The method 200 begins with training, based on historical viewing data, a viewing proportion estimation model for each of a plurality of viewers (block 210). Particularly, the processor 112 is configured to train at least one component of the reach and frequency estimation model 130 using the historical viewing data 140 for a plurality of viewers (i.e., a universe of possible viewers). The training process may take a variety of forms in which the reach and frequency estimation model 130 is trained to make predictions with respect to the exposure of the plurality of viewers to advertisement spots placed in future linear media programming.

In at least one embodiment, one or more components of the reach and frequency estimation model 130 comprise a machine learning model (e.g., XGBoost, Neural Net), which is trained based on the historical viewing data 140 and learns to recognize non-linear effects and weight features to minimize error. As used herein, the term "machine learning model" refers to a system or set of program instructions and/or data configured to implement an algorithm, process, or mathematical model (e.g., a neural network) that predicts or otherwise provides a desired output based on a given input. It will be appreciated that, in general, many or most parameters of a machine learning model are not explicitly programmed and the machine learning model is not, in the traditional sense, explicitly designed to follow specified rules in order to provide the desired output for a given input. Instead, a machine learning model is provided with a corpus of training data from which it identifies or "learns" patterns and statistical relationships in the data, which are generalized to make predictions or otherwise provide outputs with respect to new data inputs. The result of the training process is embodied in a plurality of learned parameters, kernel weights, and/or filter values that are used in the various components of the machine learning model to make predictions with respect to new data inputs.

Figure 3:
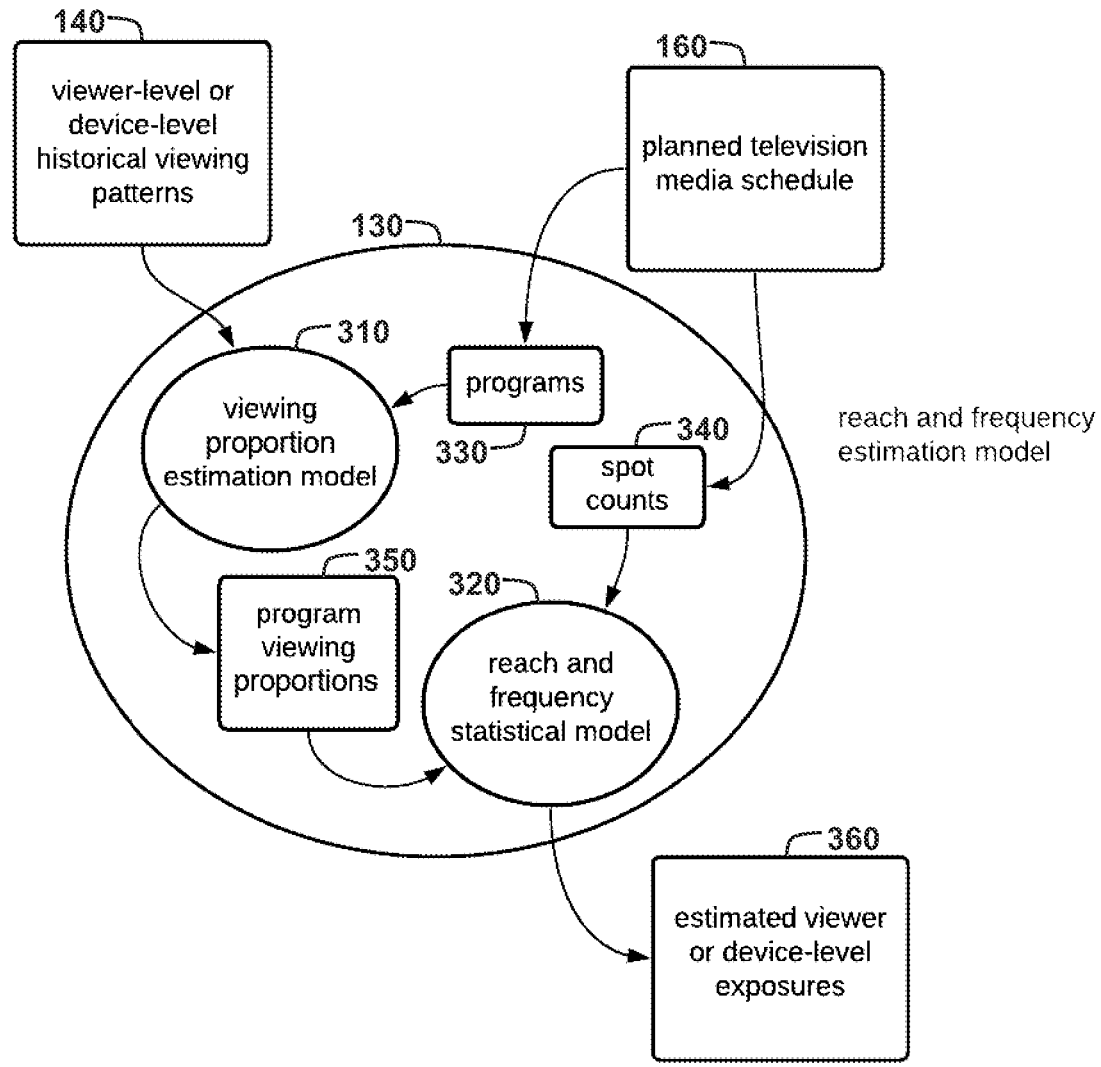
FIG. 3 shows a block diagram illustrating an exemplary embodiment of a reach and frequency estimation model.

FIG. 3 shows a block diagram illustrating an exemplary embodiment of the reach and frequency estimation model 130. In the illustrated embodiment, the reach and frequency estimation model 130 includes two sub-components: a viewing proportion estimation model 310 and a reach and frequency statistical model 320. In at least one embodiment, the viewing proportion model 310 is a machine learning model, which is trained based on the historical viewing data 140, whereas the reach and frequency statistical model 320 is a more traditional statistical model, which is not trained based the historical viewing data 140. Thus, in the training process of block 210, the processor 112 is configured to, in particular, train the viewing proportion estimation model 310 using the historical viewing data 140 for a plurality of viewers.

The viewing proportion estimation model 310 models a probability that a given viewer would be exposed to an advertisement spot airing within a defined time period. More particularly, for any given program that an advertisement spot may air in, the viewing proportion estimation model 310 estimates a probability between 0 and 1 that a given viewer would be exposed to an advertisement spot airing within the defined time period. The viewing proportion estimation model 310 can, equivalently be considered to model an expected viewing proportion of each program by each of the plurality of viewers. For example, the viewing proportion estimation model 310 might estimate a 9% probability that a viewer X will be exposed to an advertisement spot in a given program series in a specified week or, equivalently, that the viewer X will view 9% of the total duration of the program series in a specified week. To these ends, at least in some embodiments, the viewing proportion estimation model 310 may consist of an individual viewing proportion estimation model for each individual viewer in the plurality of viewers (i.e., for each viewer described in the historical viewing data 140).

The viewing proportion estimation model 310 models the expected viewing proportion of future programs for each individual viewer as a function of that viewer's historical viewing and attributes of the future programs. There are intuitive relationships between content that is the same or similar (i.e., regular viewing of a specific program series or types of sports), but the model will also find non-intuitive predictors as well. An example might be identifying program genres or specific titles that are indicators of a higher probability of watching an annual special like the Academy Awards.

Historical program airings are used as targets for the training of the viewing proportion estimation model 310. The input features for the viewing proportion estimation model 310 are generated based on analysis of viewing behaviors and can vary between different types of programming like episodic series, movies, sports events, news, and special events. For selected historical program airings (target airings), actual viewer-level viewing of those program airings is captured in the historical viewing data 140. Viewings of earlier program airings having similar attributes are also captured in the historical viewing data 140.

Additionally, when predicting consumption for a given television network, or "channel", historical viewing on that specific network channel is used ("on-channel"). However, at least for specific program types like Sports and Movies, the viewing proportion estimation model 310 advantageously leverages viewing metrics sourced from other channels ("off-channel"). For example, NFL Football games are aired on many different channels and the best predictors of a viewer to watch those games comes from viewing of football and other sports across many channels.

The historical viewing data 140 may comprise a variety of different data at least describing viewer-level historical viewing patterns of the plurality of viewers and details of the programs that were historically viewed by the plurality of viewers. In some embodiments, the historical viewing data 140 may include further data such as content engagement matrices describing relationships or clustering of the historical viewing patterns of the plurality of viewers.

In at least some embodiments, the historical viewing data 140 includes both native data entities that are natively provided by or extracted from the historical viewing data source(s) 150 and derived data entities that are determined based the native data. The native data entities generally include viewer-level historical viewing patterns and historical program details. In contrast, the derived data entities may include program attributes and viewer attributes, as discussed in greater detail below.

To these ends, the processor 112 is configured to receive raw data from the historical viewing data source(s) 150, for example, via the Internet by operating the network communications module 118, and write the raw data to the database of historical viewing data 140. The historical viewing data source(s) 150 may provide data in a variety of different non-standard formats and corresponding to different native data entities. Accordingly, in at least some embodiments, the processor 112 performs some preprocessing or rearrangement of the raw data prior to writing the data to the database of historical viewing data 140. Once the native data entities provided from the historical viewing data source(s) 150 are stored, the processor 112 processes the native data entities to calculate any further derived data entities from the native data entities.

Figure 4:
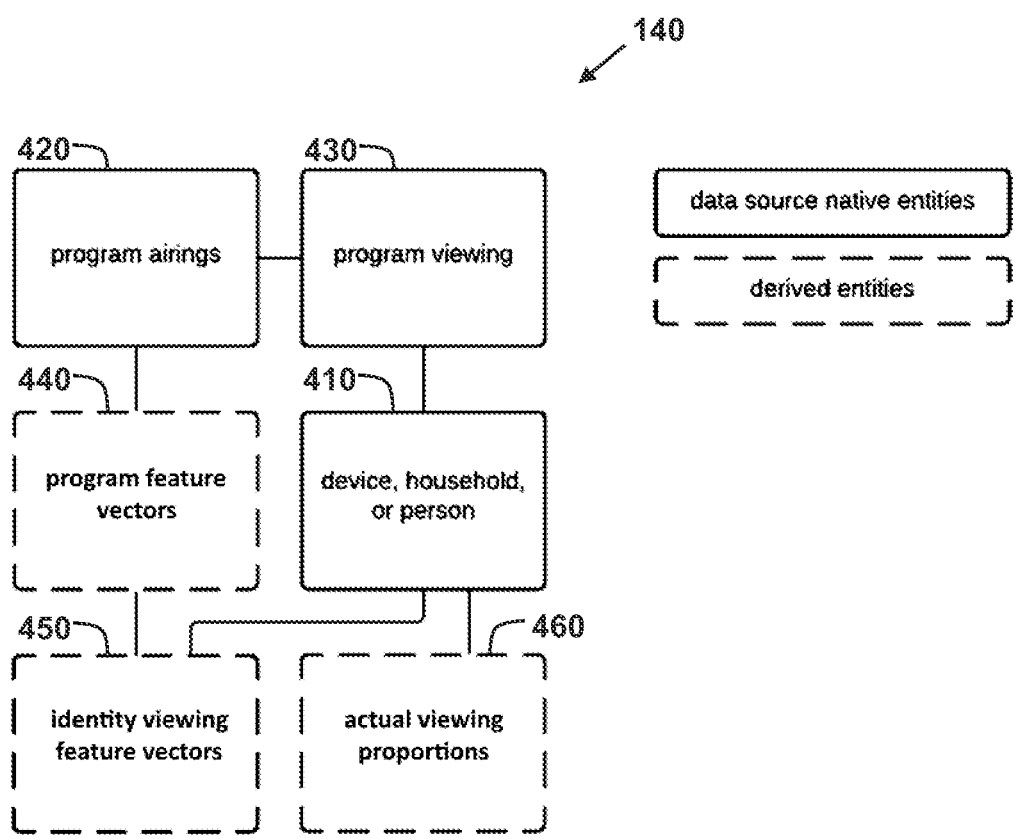
FIG. 4 shows exemplary types of data entities that may be included in a database of historical viewing data.

FIG. 4 shows exemplary types of data entities that may be included in the database of historical viewing data 140. In the illustrated embodiment, the native data entities include "device, household, or person" data 410 that consists of at least one native data entity type detailing or identifying each of the plurality of viewers for which historical viewing data has been collected (e.g., a household ID, viewer ID, or device ID). Additionally, the native data entities include "program airings" data 420 and "programming viewing" data 430. Finally, the derived data entities include "program feature vectors" 440, "identity viewing feature vectors" 450, and "actual view proportions" 460.

The "program airings" data 420 includes native data entities defining the details of particular historical airings of particular programs. These data are received, at least in some form, directly from the historical viewing data source(s) 150. FIG. 5 shows a table of exemplary values of the "program airings" data 420. The data entity types of the "program airings" data 420, indicated by each column header in the table, include (1) airing ID which identifies a particular historical program airing, (2) network, (3) broadcast date, (4) program name, (5) episode name, (6) reported start timestamp, (7) reported duration, (8) is repeat, (9) is special, and (10) genre.

The "programming viewing" data 430 includes native data entities defining the details of historical viewings of particular historical program airings by particular viewers. These data are received, at least in some form, directly from the historical viewing data source(s) 150. FIG. 6 shows a table of exemplary values of the "programming viewing" data 430. The data entity types of the "programming viewing" data 430, indicated by each column header in the table, include (1) airing ID which identifies a particular historical program airing, (2) household ID which identifies a particular viewer, (3) viewing weight, (4) target viewing minutes, and (5) target viewing proportion.

As noted above, in at least some embodiments, the processor 112 calculates a variety of the derived data entities based on the native data entities of the historical viewing data 140, including "program feature vectors" 440, "identity viewing feature vectors" 450, and "actual view proportions" 460.

The "program feature vectors" 440 includes derived data entities that indicate membership of historical program airings within various categories or buckets, referred as program attributes. The processor 112 calculates the "program feature vectors" 440 based on the native data types 410, 420, and 430 discussed above. These program attributes may include any number of different attributes or qualities of the historical program airings including, for example, (1) a plurality of airing detail attributes, (2) a plurality of genre attributes, (3) a plurality of program type attributes, (4) a plurality of content ID attributes, and (5) an actual gap period attribute.

FIG. 7 shows a table of exemplary values of the "program feature vectors" 440. In the table, reference attributes are included: a "broadcastweekstartdate" attribute indicating a start date of the broadcast week, a "program_id" attribute identifying the particular historical program airing, and a "household_id" attribute identifying the particular viewer to which the data relate. However, it should be appreciated that these reference features are not required to be input into the viewing proportion estimation model 310.

The plurality of airing detail attributes of the "program feature vectors" 440 describe the timing and other details of the particular historical program airing, such as a time block during which the historical program aired, a position in the year at which the historical program aired, a time series value, and whether the particular airing a repeat or first airing of the historical program. In some embodiments, a program duration may also be included in the plurality of airing detail attributes. With reference to FIG. 7, the exemplary "program feature vectors" 440 include an "hour3_of week" program attribute indicating a particular three-hour time block within the broadcast week during which the historical program aired. In this example, the week is divided into 56 three-hour time blocks starting, for example, on Monday at 6 AM and ending, for example, on the following Monday at 5:59 AM. The exemplary "program feature vectors" 440 further include a "position_in_year" program attribute indicating a position in the year at which the historical program aired, represented by a number between 0 and 1. The exemplary "program feature vectors" 440 further include a "time_series" program attribute indicating a time series value formed from the "position_in_year" and the year (e.g., 2021) to enable the recognition of multi-year viewing trends. Finally, the exemplary "program feature vectors" 440 further include an "is_repeat" program attribute indicating whether the particular airing a repeat or first airing of the historical program.

The genre attributes of the "program feature vectors" 440 are descriptors of the genre of the historical program airings (e.g., comedy, horror, sitcom, soap opera, soccer, historical, drama, western, etc.). These genre attributes can have varying levels of specificity and the genre information available for programming can vary between data providers. Additionally, some data providers only include a single genre for each program (e.g., "comedy") and others may include a list of genres that apply (e.g., "drama, historical, and western"). In one embodiment, these genre attributes may have a binary value of '0' or '1' to indicate whether a historical program airing is a member of the respective genre. Alternatively, these genre attributes may have a duration value to indicate the duration of the program (in seconds, for example) that corresponds to the particular genre. With reference to FIG. 7, the exemplary "program feature vectors" 440 include "genre_soap," "genre_soccer," "genre_sitcom," and "genre_comedy" genre attributes. However, it should be appreciated that, in practice, the "program feature vectors" 440 include many more genre attributes, as indicated by the entry "genre_ . . . " in the table.

The program type attributes of the "program feature vectors" 440 are high-level descriptors of the category of the historical program airings (e.g., news, sports, specials, kids, series, and movies). It should be appreciated that, in some cases, a historical program airing can be a member of multiple program types (e.g., kids and movies). In one embodiment, these program type attributes may have a binary value of '0' or '1' to indicate whether a historical program airing is a member of the respective program type. Alternatively, these program type attributes may have a duration value to indicate the duration of the program (in seconds, for example) that corresponds to the particular program type. With reference to FIG. 7, the exemplary "program feature vectors" 440 include "program_type_kids," "program_type_movies," and "program_type_news" program type attributes. However, it should be appreciated that, in practice, the "program feature vectors" 440 include many more program type attributes indicated by the entry "program_type_ . . . " in the table.

The content ID attributes of the "program feature vectors" 440 indicate the particular specific series, special event, or type of sports event. Historical program airings are labeled with contend IDs based, in part, based on its program type. For example, a television series like "Chicago PD" would be categorized according to the name of the series "Chicago PD." However, sporting events, such as NLF games airing under different program descriptions like "Monday Night Football" might be categorized by sport, league, and part of the season into "Football/NFL/Regular Season", "Football/NFL/Playoffs", or "Football/NCAA/Playoffs". These categorizations are driven by the program metadata available in the datasets supplied by various data providers. With reference to FIG. 7, the exemplary "program feature vectors" 440 include three exemplary content ID attributes in the form "content_id_XXXXXXXXX . . . " in which an encoded string is utilized rather that the human readable title or category for the content ID. The content names are encoded to avoid errors with special characters like accents or punctuation that conflict with database naming conventions, etc. It should be appreciated that, in practice, the "program feature vectors" 440 include many more content ID attributes indicated by the entry "content_id_ . . . " in the table.

In some embodiments, the number of content ID attributes is constrained to prevent the "program feature vectors" 440 data from becoming too large. Particularly, for many networks, the number of unique content names appearing in the historical viewing data would generate a matrix that is too large when expanded into individual content ID attributes. In one embodiment, to limit the number of content indicators included in the feature vectors, logic is applied to select the top-ranking content by ranking them by various viewing attributes, including: (1) average audience—captures historical programs having a single or few airings like major sports events or specials that have large audiences; (2) total audience—captures historical programs that represents a substantial portion of total viewing for that network even if they have smaller audiences per airing; (3) number of airings—captures historical programs that run frequently in the network's schedule; and (4) recency—favors historical programs that have aired recently over programs that aired further in the past and may no longer be scheduled. A predetermined and configurable number of top-ranking programs across these categories are included and encoded into the feature set. Thus, in these embodiments, some historical program airings will not be associated with any of encoded content ID attributes. However, these historical program airings are still captured in the remaining program attributes that are included for all programs such as program type, genre, time of day, and day of week. This enables the model to still recognize viewing patterns and produce estimates for such historical program airings.

Returning to FIG. 4, the "identity viewing feature vectors" 450 includes derived data entities that define aggregated historical viewing statistics, referred to as viewer attributes, for the different program attributes. The processor 112 calculates the "identity viewing feature vectors" 450 based on the native data types 410, 420, and 430 and the derived data 440, discussed above. In general, most of the viewer attributes represent a proportion of a total duration of available programming that was viewed by a particular viewer that corresponds to a particular program attribute. Normalizing these viewer attributes as proportion of total program time across many different observed viewing periods, as opposed to the total time viewed of each bucket allows for predictions to be made using more recent observed viewing periods in which the total available program time for a given category will vary. The viewer attributes may include, for example, (1) a plurality time block viewing attributes, (2) a plurality of genre viewing attributes, (3) a plurality of program type viewing attributes, (4) a plurality of content ID viewing attributes, (5) a recency of viewing attribute, and (6) a forecasting period attribute.

FIG. 8 shows a table of exemplary values of the "identity viewing feature vectors" 450. In the table, reference attributes are included: a "broadcastweekstartdate" attribute indicating a start date of the broadcast week, a "program_id" attribute identifying the particular historical program airing, and a "household_id" attribute identifying the particular viewer to which the data relate. However, it should be appreciated that these reference features are not required to be input into the viewing proportion estimation model 310.

The exemplary "identity viewing feature vectors" 450 include three exemplary time block viewing attributes in the form "hour3_of_week_X" in which the 'X' identifies the particular three-hour time block within the broadcast week (e.g., out of 56 three-hour time blocks in each week). In each case, the value of the attribute is a value between 0 and 1 identifying a proportion of a total duration of available programming that was viewed by a particular viewer within the respective time block. It should be appreciated that, in practice, the "identity viewing feature vectors" 450 include many more time block viewing attributes indicated by the entry "hour3_of_week_ . . . " in the table.

The exemplary "identity viewing feature vectors" 450 include four exemplary program type viewing attributes in the form "viewing_program_type_XXXX" in which the 'XXXX' identifies the particular program type. In each case the value of the attribute is a value between 0 and 1 identifying a proportion of a total duration of available programming that was viewed by a particular viewer that corresponds to the respective program type. It should be appreciated that, in practice, the "identity viewing feature vectors" 450 include many more program type viewing attributes indicated by the entry "viewing_program_type_ . . . " in the table.

The exemplary "identity viewing feature vectors" 450 include four exemplary content ID viewing attributes in the form "viewing_content_id_XXXX" in which the 'XXXX' encodes the particular content ID, as discussed above. In each case the value of the attribute is a value between 0 and 1 identifying a proportion of a total duration of available programming that was viewed by a particular viewer that corresponds to the respective content ID. It should be appreciated that, in practice, the "identity viewing feature vectors" 450 include many more content ID viewing attributes indicated by the entry "viewing_content_id_ . . . " in the table.

The exemplary "identity viewing feature vectors" 450 include four exemplary genre viewing attributes in the form "viewing_genre_XXXX" in which the 'XXXX' identifies the particular genre. In each case the value of the attribute is a value between 0 and 1 identifying a proportion of a total duration of available programming that was viewed by a particular viewer that corresponds to the respective genre. It should be appreciated that, in practice, the "identity viewing feature vectors" 450 include many more genre viewing attributes indicated by the entry "viewing_genre_ . . . " in the table.

Finally, the exemplary "identity viewing feature vectors" 450 include "viewing_recency_weeks" attribute. This recency of viewing attribute is a measure of the number of weeks between the last data of viewing data and the last date of observed viewing for a given viewer. For example, a given viewer may have watched television regularly in the past but has not had any observed viewing during the most recent weeks.

With continued reference to FIG. 8, the table further includes an exemplary value for the "actual viewing proportions" 460. Particularly, the "viewing_proportion" attribute indicates an actual proportion of a historical program airing that was viewed by a particular viewer. In at least some embodiments, the processor 112 derives the "viewing_proportion" attributes by extracting the corresponding values from the "programming viewing" data 430 (e.g., the target viewing proportions).

The processor 112 is configured to train the viewing proportion estimation model 310, using the "actual viewing proportions" 460 as the dependent variable (i.e., as the target output). The program attributes of the "program feature vectors" 440 and the viewer attributes of the "identity viewing feature vectors" 450 are provided as the independent variables during training. Thus, during training cycles, the predicted outputs are cross-validated with the values of the actual viewing proportion data entity using, for example, an objective function or a loss function. The error in the predicted output is used to optimize the parameters of the viewing proportion estimation model 310 in an iterative manner.

Figure 9:
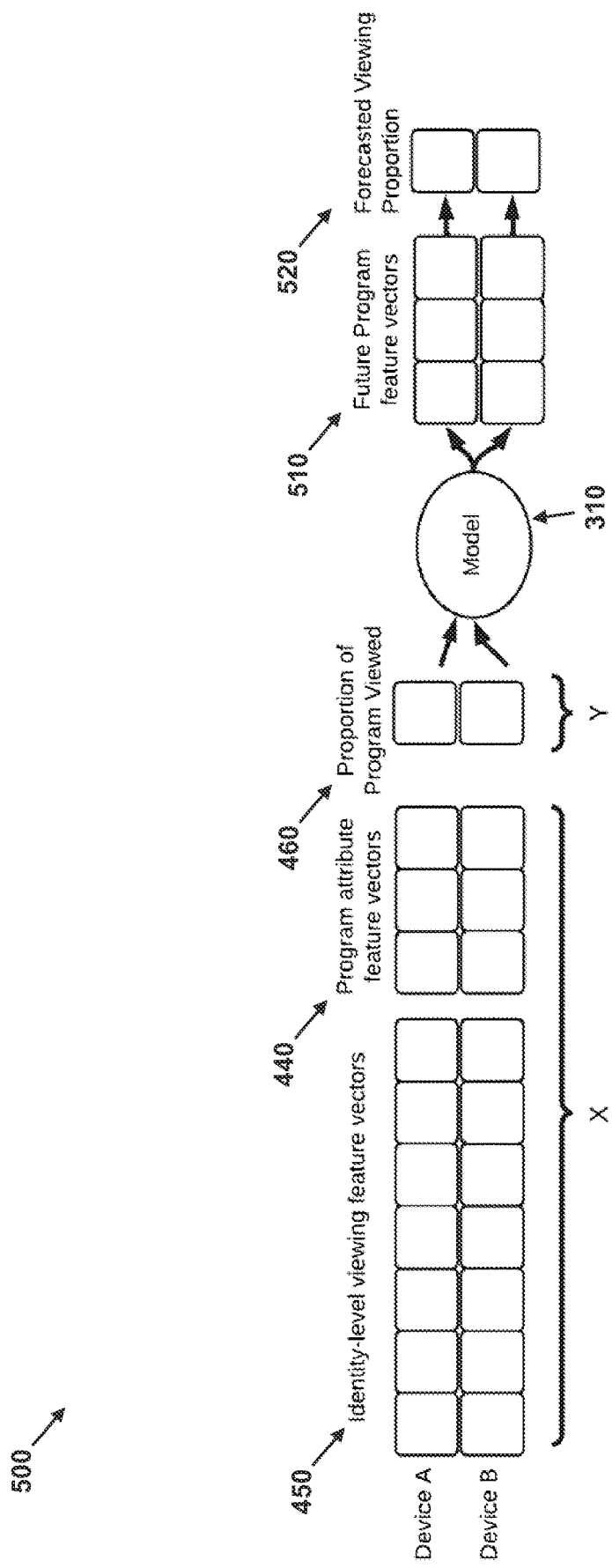
FIG. 9 shows a flow diagram summarizing the logical modeling approach adopted by the viewing proportion estimation model.

FIG. 9 shows a flow diagram 500 summarizing the logical modeling approach adopted by the viewing proportion estimation model 310 during training and prediction. Each training data point consists of a single dependent variable indicating the proportion of a given program's total duration viewed by a given viewer and independent variables in the form of a feature vector constructed from a combination of program attributes and viewer attributes. As discussed in greater detail above, the program attributes and viewer attributes capture a large number of useful attributes from the historical program viewing data 140, including metrics that represent observed viewing behaviors for each viewer, attributes of the program airings for which the proportion of duration viewed is being observed, and date and position in year metrics to capture seasonal effects and long-term viewing trends.

During training, the processor 112 provides the "program feature vectors" 440 and the "identity viewing feature vectors" 450 to the viewing proportion estimation model 310 as the independent variables, and provides the "actual viewing proportions" 460 to the viewing proportion estimation model 310 as the dependent variable. During forecasting, "future program feature vectors" 510 are derived from future program details (included in the planned advertising campaign details 160), which are essentially similar in form to the "program feature vectors" 440. These "future program feature vectors" 510, in combination with the "identity viewing feature vectors" 450 for viewers of interest, are used by the viewing proportion estimation model 310 to generate "forecasted viewing proportions" 520 corresponding to the future programs.

In at least some embodiments, the viewing proportion estimation model 310 is configured to predict identity-level viewing for future content for variable periods between the latest data of historical viewing data available and the future period being predicted. This makes the viewing proportion estimation model 310 more flexible and efficient than running a distinct training cycle for every period between the last date of available viewing data and the date of the program airings being forecasted (i.e., estimating 2 weeks out, 3 months out, 4 quarters out, etc.).

Figure 10A:
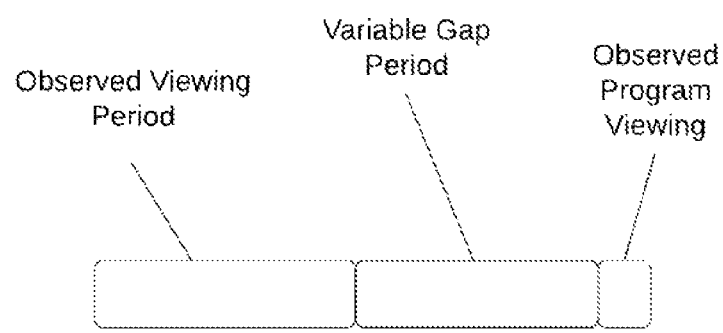
FIG. 10A shows a variable gap period for training.
Figure 10B:
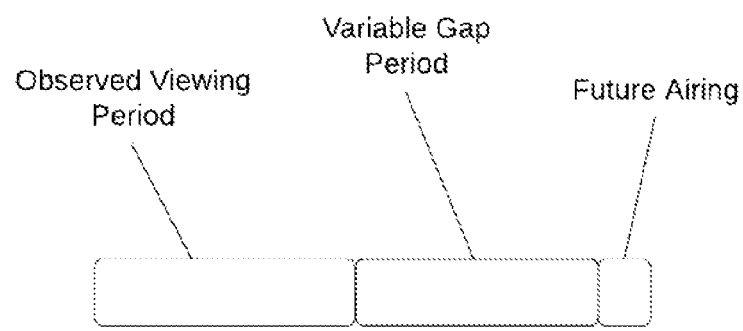
FIG. 10B shows a variable gap period for forecasting.

FIG. 10A and FIG. 10B illustrate the variable gap period for training and forecasting, respectively. As an example, when generating estimates on a given day, the historical viewing data may extend to 3 days ago and the system may be forecasting viewing for a 13-week period that starts 8 weeks from the given day. This can be described by an observed viewing period spanning from (t−185 days) through (t−3 days), a gap period spanning from (t−3 days) to (t+55 days), and forecast target period spanning from (t+56 days) to (t+147 days). Thus, in the training data, the gap period is a time period between the airing dates of sampled historical programs (i.e., the "observed viewing period") and the dates of the sampled observed program viewing proportions (i.e., the "observed program viewing"). Likewise, during prediction, the gap period is the time period between the airing dates if the sampled historical programs (i.e., the "observed viewing period") and the airing dates of the future programs during the forecast period during which predictions are to be made (i.e., the "future airing").

In order to create training data for a variety of distinct gap periods, the following process is performed. The processor 112 takes a random sample of the total universe of unique viewers/identities found in the historical viewing data 140. Next, the processor 112 generates a "supervised sample" of the historical program airings within the historical viewing data 140, forcing inclusion of the various program types, dayparts, genres, etc. that will be forecasted in the future schedule. Next, for each sampled program airing, processor 112 generates many "gap periods" of randomly varying date ranges that cover the intended use of the model. As noted above, this gap period may be stored as a feature in of "program feature vectors" 440. For example, the gap periods may range from 1 day prior to the program airing (forecasting tomorrow's viewing) to several quarters prior.

Figure 11:
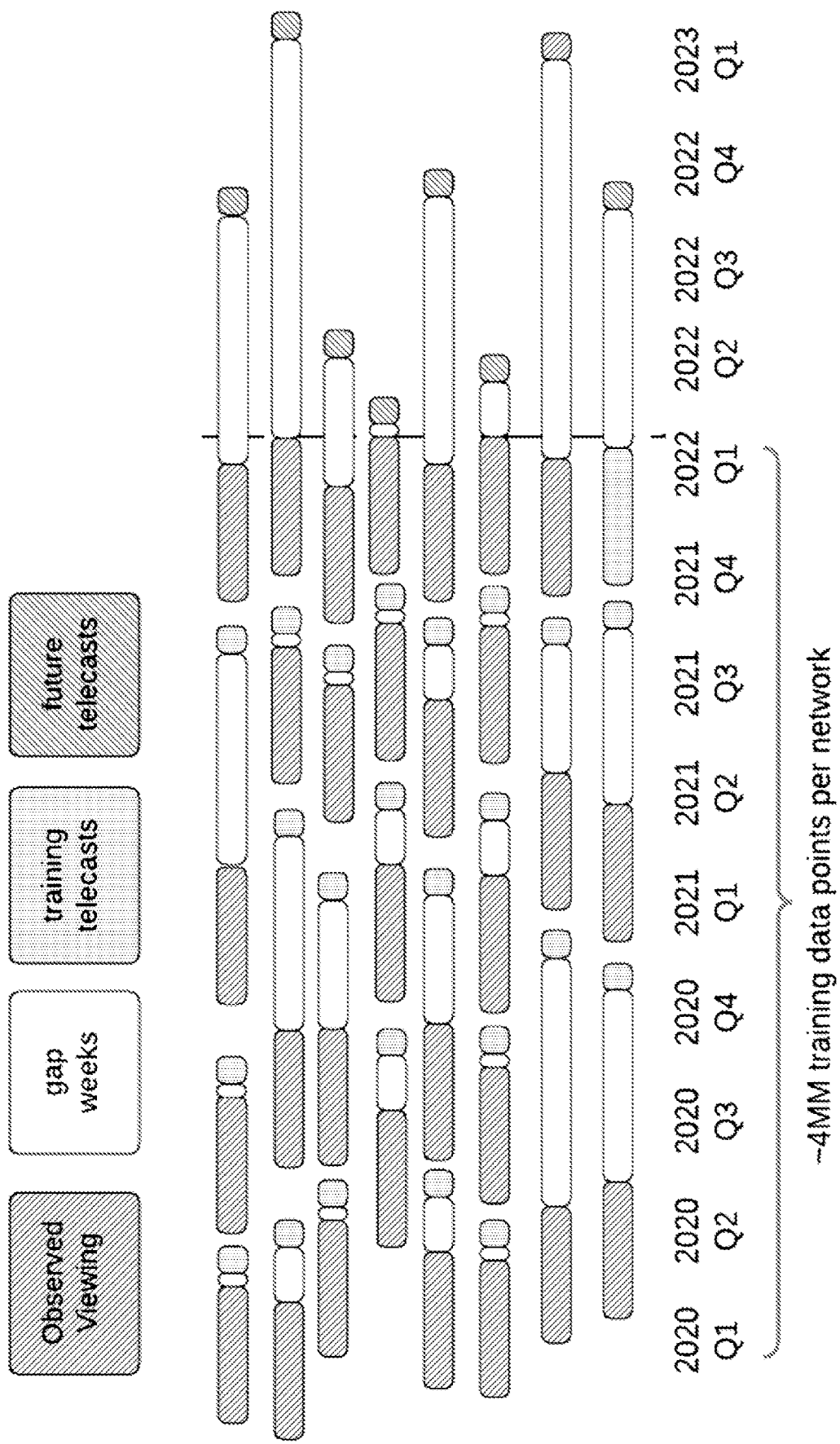
FIG. 11 shows a training data set having variable gap periods.

Next, for each program airing and gap period combination, processor 112 generates observed identity viewing features for each viewer in the sample for a set date range or "observed viewing" period prior to the gap period. The generated observed viewing identity features are in the same form discussed above with respect to the "identity viewing feature vectors" 450. The length of the observed viewing period depends on the date ranges of the historical viewing data made available. It could be 24 months to capture two years of seasonal viewing behaviors, or it could be as short as 13-26 weeks. Finally, the processor 112 determines the proportion of duration viewed by each sampled identity for the target airing, including 0 for "no viewing". The result is a large training data set of several million data points, as shown in FIG. 11. The total number of data points can be controlled by changing the sample sizes used to produce the final matrix.

When the viewing proportion estimation model 310 is trained in this manner, the processor 112 provides the forecasting period (e.g., specified by the "gap_weeks" attribute shown in FIG. 8) as an input to the model 310 at the time of prediction. Thus, the viewing proportion estimation model 310 determines expected viewing proportions, in part, based on the forecasting period and/or the gap period (i.e., the time period of interest for which predictions are to be made).

Returning to FIG. 2, the method 200 continues with determining a plurality of viewing proportions with respect to a plurality of future programs for each of the plurality of viewers (block 220). Particularly, for each respective viewer of the plurality of viewers (at least those that are within a target audience for the planned advertising campaign) and for each respective program that an advertisement spot may air in, the processor 112 uses the viewing proportion estimation model 310 to estimate a program viewing proportion between 0 and 1 indicating the proportion of the total duration of the respective program that the respective viewer will view. For clarity, suppose that a set of viewers within the target audience includes K viewers from the plurality of viewers that are described by the historical viewing data 140, and that advertisement spots may air within a set of programs that includes I programs. Using uses the viewing proportion estimation model 310, the processor 112 calculates a set of program viewing proportions $p_{i,k}$, where the subscript i identifies a respective program in the set of programs I and the subscript k identifies the respective viewer in the target audience K for the planned advertising campaign.

With reference again to FIG. 3, the planned advertising campaign details 160 include (1) future program details 330 that identify a set of future programs within which an advertisement spot will air in or may air in and (2) advertisement spot details 340 that identify spot counts detailing how many advertisement spot will air or may air in each program in the set of future programs. It will be appreciated that the set of future programs and the spot counts will generally depend on the advertisement spot purchase agreement, and are thus independent input variables to reach and frequency estimation model 130. The viewing proportion estimation model 310, in particular, takes the future program details 330 as an input to determine a set of program viewing proportions 350 (i.e., the set of program viewing proportions $p_{i,k}$).

The future program details 330 include data entities defining the details of particular future airings of particular programs. Thus, the future program details 330 may take the form of data which is similar in form to the "program airings" data 420, which is illustrated in an exemplary manner in FIG. 5. Accordingly, the future program details 330 may include values for data entity types such as (1) target airing ID which identifies a particular future program airing, (2) network, (3) broadcast date, (4) program name, (5) episode name, (6) reported start timestamp, (7) reported duration, (8) is repeat, (9) is special, and (10) genre.

The processor 112 receives and processes the future program details 330 to derive the "future program feature vectors" 510, which are essentially similar in form to the "program feature vectors" 440. These "future program feature vectors" 510, in combination with the "identity viewing feature vectors" 450 for viewers of interest for the estimation input data. Accordingly, in order to derive the estimation input data, the processor 112 performs the processing and statistical aggregation that were described above with respect to deriving the "program feature vectors" 440 and the "identity viewing feature vectors" 450, except now these processes are performed on future program details 330. Finally, the processor 112 utilizes the viewing proportion estimation model 310, taking the estimation input data as input, to calculate the set of program viewing proportions $p_{i,k}$.

FIG. 12A shows a table of exemplary output data 610 of the viewing proportion estimation model 310. The output data 610 includes data entities, indicated by each column header in the table, including (1) target airing ID which identifies a particular future program airing, (2) household ID which identifies a particular viewer, and (3) estimated viewing proportion which identifies the estimate program viewing proportion for the particular future program by the particular viewer. FIG. 12B shows a table of exemplary program viewing proportions 620 for viewers 1-4 and programs 1-5.

In some embodiments, individual program airings in the future linear media schedule are aggregated into "selling titles" over time and across different program series and events, which is often the case when commercial advertisements are purchases and scheduled on television networks. Selling titles that can be series-specific, airing-specific, collections of related programs, or daypart rollups based on days and times. For example, several dramatic series on a network airing Monday through Friday between 2:00 PM and 6:00 PM can be combined into a selling title named "M-F Afternoon Dramas". It is assumed that advertisements scheduled on these selling titles can be can air anywhere within the specified days and time ranges on the specified program genres.

In such embodiments, because program viewing proportions estimates are generated at a program-specific level, the processor 112 combines these estimates to reflect the weighted viewing proportion across all of the programs that are included in each selling title definition. The processor 112 calculates the estimated viewing proportions estimates for each aggregated selling title as the mean of the program viewing proportions program viewing proportions for each future program in the respective aggregated selling title, weighted by their total duration within the selling title's day/time definition.

For clarity, suppose that a set of selling titles include J selling titles, each consisting of a respective subset of individual future programs i from the set of future programs I. Based on the program viewing proportions $p_{i,k}$ for the individual future programs i, the processor 112 calculates a set of selling title viewing proportions $P_{j,k}$ according to:

$$P_{j,k} = \frac{\sum p_{i,k} t_i}{\sum t_i},$$

where the subscript j identifies the respective selling title, the subscript i identifies the respective program in the selling title j, the subscript k identifies the respective viewer, $p_{i,k}$ indicates the estimated program viewing proportion of the respective program i by the respective viewer k, and $t_i$ indicates the duration of the respective program i.

FIG. 13A shows a table of exemplary data 630 of the selling title aggregation. The data 630 of the selling title aggregation is essentially similar to the output data 610, except that it is supplemented with selling title aggregation information and program airing durations. Particularly, the output data 630 includes data entities, indicated by each column header in the table, (1) selling title which identifies the aggregated selling title, (2) target airing ID which identifies a particular future program airing, (3) target airing duration, (4) household ID which identifies a particular viewer, and (5) estimated viewing proportion which identifies the estimate program viewing proportion for the particular future program by the particular viewer. FIG. 13B shows a table of exemplary selling title viewing proportions 640 for viewers 1-4 and selling titles 1-5.

In some embodiments, the set of program viewing proportions $p_{i,k}$ or the set of selling title viewing proportions $P_{i,k}$ may be further post-processed or adjusted according to one or more additional evidence-based rules or heuristics. Particularly, in one example, the viewing proportions may be reduced according to a known behavior of particular viewers, such as a habit of changing channel during commercials, which is not adequately captured by the expected viewing proportion (which implicitly assumes that a random proportion of a program is aired).

Returning to FIG. 2, the method 200 continues with determining a reach and frequency of an advertising campaign based the plurality of viewing proportions and advertisement spot counts for each future program that is involved in the advertising campaign (block 230). Particularly, for each respective viewer k, the processor 112 uses the reach and frequency statistical model 320 to estimate a reach $R_k$ and a frequency $F_k$ for one or more defined time periods of the planned advertising campaign (e.g., on an daily or weekly basis), where the subscript k identifies the respective viewer.

With reference again to FIG. 3, as noted above, the planned advertising campaign details 160 include the advertisement spot details 340 that identify spot counts detailing how many advertisement spot will air or may air in each program in the set of future programs. In practice these spot counts can be provided on a program by program basis or they can be provided on a selling title basis, depending on the advertisement spot purchase agreement. FIG. 14A shows a table of exemplary spot counts 700 for exemplary programs 1-5. Likewise, FIG. 14B shows a table of exemplary spot counts 710 for exemplary selling titles 1-5.

The reach and frequency statistical model 320 takes the advertisement spot details 340 and the program viewing proportions 350 as inputs to calculate estimated exposures 360, which include a reach $R_k$ and a frequency $F_k$ values. Accordingly, using the reach and frequency statistical model 320, the processor 112 calculates the reach $R_k$ and a frequency $F_k$ values for the target audience K based on the set of program viewing proportions $p_{i,k}$ or the set of selling title viewing proportions $P_{i,k}$.

Each reach value $R_k$ identifies a probability between 0 and 1 that the respective viewer k will be exposed to an advertisement at least once within a defined time period. The defined time period may, for example, be a particular day or week during the planned advertising campaign or simply the entire duration of the planned advertising campaign. In one embodiment, the processor 112 calculates each reach value $R_k$ according to:

$$R_k = 1 - \Pi_{i=1}(1-p_{i,k})^{s_i},$$

where $p_{i,k}$ indicates the estimated program viewing proportion of the respective program i by the respective viewer k and $s_i$ indicates the number of spots allocated to the respective program i.

Likewise, in the case of aggregated selling titles, the processor 112 calculates each reach value $R_k$ according to:

$$R_k = 1 - \Pi_{j=1}(1-P_{j,k})^{S_j},$$

where $P_{j,k}$ indicates the estimated selling title viewing proportion of the respective selling title j by the respective viewer k and $S_j$ indicates the number of spots allocated to the respective selling title j.

Each frequency value $F_k$ identifies an estimated total number of times that that the respective viewer k will be exposed to an advertisement within a defined time period. In one embodiment, the processor 112 calculates each frequency value $F_k$ according to:

$$F_k = \Sigma_{i=1} p_{i,k} s_i,$$

where $p_{i,k}$ indicates the estimated program viewing proportion of the respective program i by the respective viewer k and $s_i$ indicates the number of spots allocated to the respective program i.

Likewise, in the case of aggregated selling titles, the processor 112 calculates each frequency value $F_k$ according to:

$$F_k = \Sigma_{j=1} P_{j,k} S_j,$$

where $P_{j,k}$ indicates the estimated program viewing proportion of the respective selling title j by the respective viewer k and $S_j$ indicates the number of spots allocated to the respective selling title j.

FIG. 15 shows a table of exemplary output data 720 of the reach and frequency statistical model 320. Particularly, the output data 720 includes data entities, indicated by each column header in the table, including (1) week of the planned advertising campaign, (2) household ID which identifies a particular viewer, (3) reach probability which identifies a probability that the respective viewer will be exposed to an advertisement at least once within the respective week, and (4) estimated exposures which identifies the estimated total number of times that that the respective viewer will be exposed to an advertisement within the respective week.

It should be appreciated that the reach probabilities $R_k$ and expected frequencies $F_k$ can be calculated and re-calculated at any point using the most up-to-date data from the various input sources, including the future program schedule, the advertiser's media schedule (spot placements), and the most recent available viewing data from the viewing data source. Estimates can be generated that represent the estimated totals for each viewer for the entire campaign, or by week within the flight dates of the campaign. These reach probabilities $R_k$ and expected frequencies $F_k$ can be mapped with identities from other platforms like streaming services and filters can be applied to the estimates.

It should be appreciated that, once identified, these reach probabilities $R_k$ and expected frequencies $F_k$ are useful to an advertiser or advertising platform for a variety of reasons. Notably, as described in further detail above, advertising on linear media platforms, such as linear television, traditionally presents a challenge for advertising campaign planners with respect to over-exposing and under-exposing various persons in their target audience. By determining these reach probabilities $R_k$ and expected frequencies $F_k$, the system 100 overcomes the technological limitations of linear media platforms and helps advertisers increase the reach of their advertising campaigns, while improving control of exposure frequency across linear media and OTT media platforms. Likewise, from the perspective of an advertising platform, providing this type of exposure forecasting to potential advertisers provides significant value. Some exemplary use cases for the exposure forecasting are described below in more detail.

Methods for Compensating for Under-Exposure and Over-Exposure

In one embodiment, the advertisement exposure forecasting system 100 is advantageously utilized to predict and compensate for under-exposure and over-exposure of particular viewers by a linear media portion of an advertising campaign. As noted before, one concern of campaign planning across media is the prospect of under-exposing certain persons in their target audience, while over-exposing other persons in their target audience. The previously determined reach probabilities $R_k$ and expected frequencies $F_k$ can be advantageously utilized to predict which viewers are likely be under-exposed to an advertising campaign or over-exposed to a planned advertising campaign. Based on this prediction, an advertising campaign planner can compensate for the under-exposure and over-exposure using other advertising platforms, or by adjusting the planned advertising campaign itself.

Figure 16:
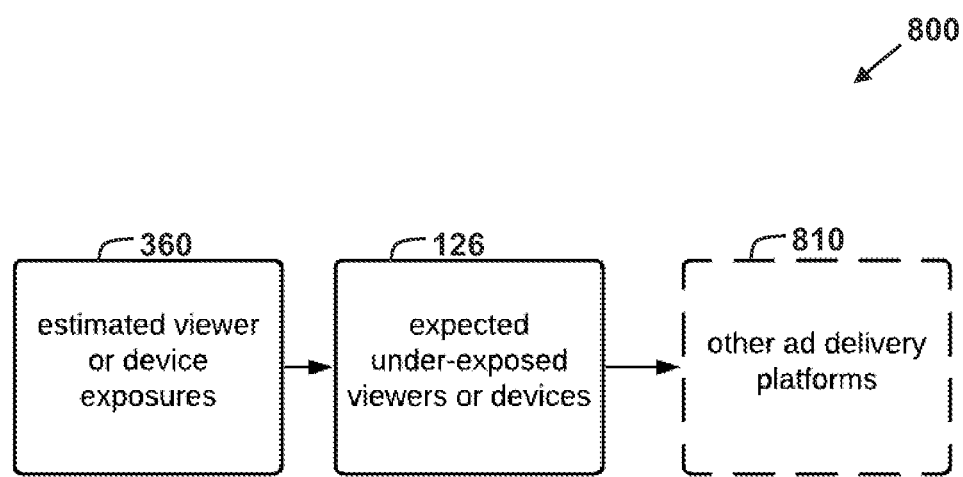
FIG. 16 shows a flow diagram for a process for determining and compensating for the under-exposure of certain viewers.

FIG. 16 shows a flow diagram for a process 800 for determining and compensating for the under-exposure of certain viewers. The estimated exposures 360 (i.e., the reach probabilities $R_k$ and expected frequencies $F_k$) are determined by the reach and frequency estimation model 130 as discussed above with respect to the method 200.

Next, the processor 112 determines the subset of under-exposed viewers 126 based on the estimated exposures 360. Particularly, the processor 112 determines the subset of under-exposed viewers 126 based on the reach probabilities $R_k$ and expected frequencies $F_k$ for the viewers in the target audience. As discussed above, the under-exposed viewers 126 include any viewers that are within the target audience but are not expected to be reached or are not expected to be exposed enough times by the planned advertising campaign. In some embodiments, the processor 112 calculates the subset of under-exposed viewers 126 by comparing the expected frequencies $F_k$ for the viewers in the target audience with an under-exposure threshold $F_{under\_exp}$. In response to an expected frequency $F_k$ being less than the under-exposure threshold $F_{under\_exp}$, the processor 112 determines the respective viewer k to be under-exposed.

Finally, based on the subset of under-exposed viewers 126, other advertising platforms 810 can be utilized by an advertiser to compensate for the under-exposure of the under-exposed viewers 126. As an example, once identified, the subset of under-exposed viewers 126 can be can be targeted on other advertising platforms that are able to serve ads to specific individuals, such as OTT media platforms. This is particularly advantageous for multi-media advertising platforms that can provide advertising on both linear media and OTT media (such as those provided by certain content providers with both linear media and OTT distribution platforms). Moreover, if the subset of under-exposed viewers 126 is too large, the planned advertising campaign can be adjusted in the pre-flight period or during the flight of the linear media schedule.

In a similar manner, the subset of over-exposed viewers 128 can be determined and compensating for as necessary. Particularly, the processor 112 determines the subset of over-exposed viewers 128 within the target audience based on the reach probabilities $R_k$ and expected frequencies $F_k$ for the viewers in the target audience. As discussed above, the over-exposed viewers 128 include any viewers are expected to be exposed too many times by the planned advertising campaign. In some embodiments, the processor 112 calculates the subset of over-exposed viewers 128 by comparing the expected frequencies $F_k$ for the viewers in the target audience with an over-exposure threshold $F_{over\_exp}$. In response to an expected frequency $F_k$ being greater than the over-exposure threshold $F_{over\_exp}$, the processor 112 determines the respective viewer k to be over-exposed.

Once identified, the over-exposed viewers 128 can be suppressed (i.e., not targeted or targeted less) on other advertising platforms that are able to serve ads to specific individuals, such as OTT media platforms. Moreover, if the subset of over-exposed viewers 128 is too large, the planned advertising campaign can be adjusted in the pre-flight period or during the flight of the linear media schedule.

Depending on the over-exposure concerns of the advertiser, the over-exposed viewers 128 may be limited to only those viewers that are within the target audience and are expected to be exposed too many times by the planned advertising campaign. Alternatively, or in addition, the over-exposed viewers 128 may include viewers that are outside the target audience but are nonetheless expected to be exposed too many times by the planned advertising campaign.

Methods for Reach and Frequency Optimization

In another embodiment, the advertisement exposure forecasting system 100 is advantageously utilized to perform optimizations of the planned advertising campaign with respect to reach and frequency. Particularly, a media schedule that is optimized with respect to reach and frequency can be determined, in part based on the previously determined reach probabilities $R_k$ and expected frequencies $F_k$. The optimized media schedule can advantageously be utilized to make recommendations for adjustments to a planned advertising campaign (i.e., an adjustment to the schedule or program placement of the advertisement spots).

Figure 17:
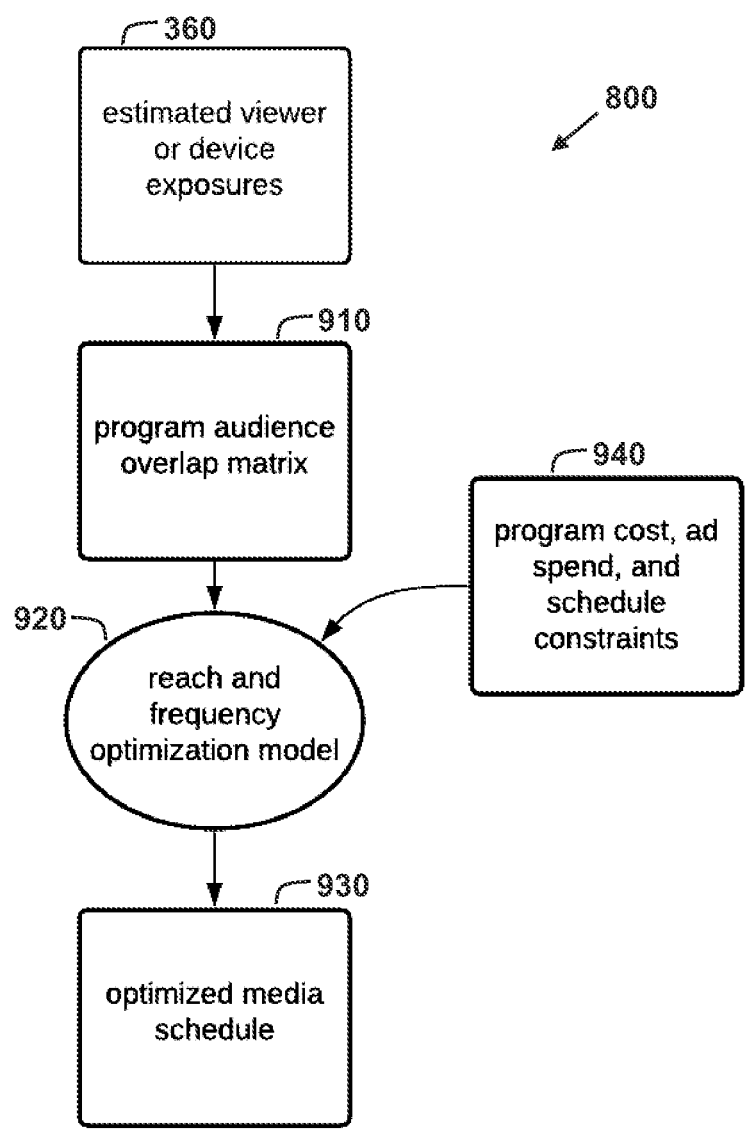
FIG. 17 shows a flow diagram for a process for generating a media schedule that is optimized with respect to reach and frequency.

FIG. 17 shows a flow diagram for a process 900 for generating a media schedule that is optimized with respect to reach and frequency. The estimated exposures 360 (i.e., the reach probabilities $R_k$ and expected frequencies $F_k$) are determined by the reach and frequency estimation model 130 as discussed above with respect to the method 200. Next, the processor 112 generates an overlap proportion matrix 910 for planned programming at the viewer-level for all of the future programs or selling titles within which an advertisement spot can be scheduled. The overlap proportion matrix 910 has values indicating the overlap in in predicted viewers of each future programs or selling titles within which an advertisement spot can be scheduled. The processor 112 generates an overlap proportion matrix 910 based on the program viewing proportions $p_{i,k}$ or the selling title viewing proportions $P_{i,k}$. FIG. 18 shows a table of exemplary selling title audience overlaps values 940 as a proportion of their combined audiences.

Once the overlap proportion matrix 910 is generated, the processor 112 uses a reach and frequency optimization model 920 to generate an optimized media schedule 930 that maximizes one or more objectives, such as total reach or cost per reach. Particularly, using the reach and frequency optimization model 920, processor 112 generates the optimized media schedule 930 based on the overlap proportion matrix 910 and taking into account constraints 940 including, for example, program cost constraints, advertisement spending/budget constraints, audience size constraints, and business constraints. The optimized media schedule 930 identifies which particular future programs within which an advertisement spot should be optimally aired, based on the overlap proportion matrix to satisfy or optimize one or more goals, while satisfying the constraints 940. In one embodiment, the processor 112 generates the optimized media schedule 930 such that advertisements are placed in programming with lower overlap proportions of their combined audience sizes, thus yielding a higher total reach.

As discussed before, in some embodiments, the advertisement exposure forecasting system 100 may incorporate a web-interface or equivalent mechanism for providing exposure forecasting information a client advertiser or client advertising platform. In one embodiment, the web-interface or equivalent of the advertisement exposure forecasting system 100 may also provide recommendations for adjusting the planned advertising campaign based on the optimized media schedule 930 (e.g., an adjustment to the schedule or program placement of the advertisement spots). In some embodiments, the advertisement exposure forecasting system 100 may optionally execute supplemental purchases of advertising time or advertisement exposures purchase on behalf of a client advertiser, based on the optimized media schedule 930.

Methods for Advertisement Attribution Modeling and Forecasting

In another embodiment, the advertisement exposure forecasting system 100 is advantageously utilized to model and forecast advertisement attributions. Attribution refers to a measurable behavioral impact of the exposure a viewer to an advertisement spot. In particularly, as used herein, an "attribution" refers to a viewer of an advertisement spot performing a defined activity as a result of viewing the plurality of advertisement spots. The defined activity generally comprises some commercial activity such as visiting a retail location, visiting a web site, or purchasing a product. For many brands, the historical performances of aired advertisement spots can be modeled as a function of time of day, day of week, or annual seasonality. However, the attributes of the viewers exposed are also a key component of outcomes. Thus, the historical performances of aired advertisement spots can be further modeled against the proportions of audiences exposed to those advertisement spots by gender, age, income, education, etc.

One example of viewer attributes that effect outcomes is that advertisements for home improvement outlet stores may result in more in-store visits for the exposed set of viewers within the next 7 days when those advertisements fall within programs that have a higher proportion of males within a certain income bracket. Another example of viewer attributes that effect outcomes is that advertisements in programs that are seen by a higher proportion of retirement aged, higher income married persons in weekday evenings may result in a higher proportion of visits to an investment broker web site within 30 minutes. These examples are intuitive, but rigorous modeling can often produce many non-intuitive results that are not so obvious. These models can then be applied to the future programming against the expected audience compositions based on the aggregated viewer-level exposure probabilities even for channels and programs that the advertiser has never aired in before.

Figure 19:
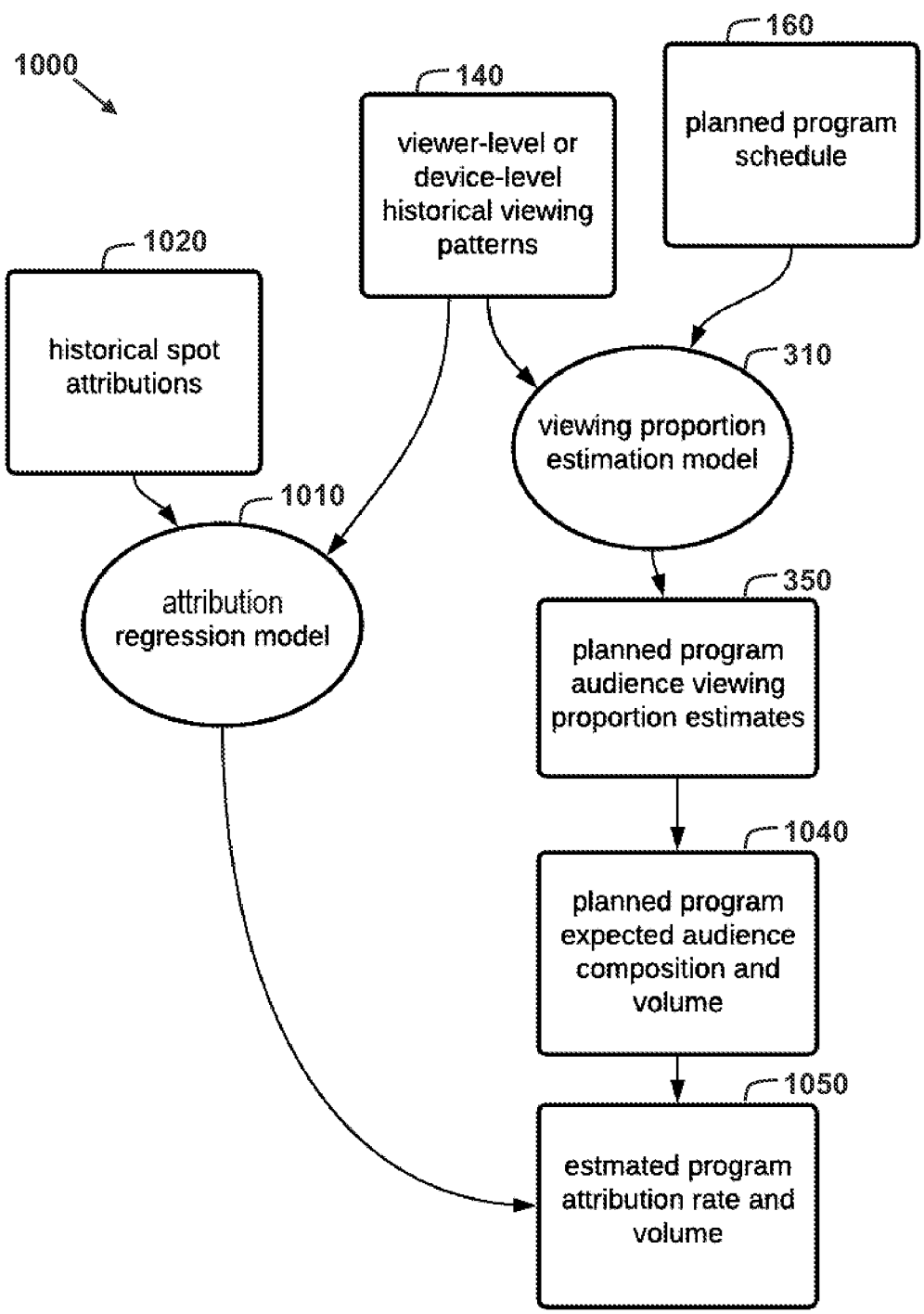
FIG. 19 shows a flow diagram for a process for modeling and forecasting advertisement attributions.

FIG. 19 shows a flow diagram for a process 1000 for modeling and forecasting advertisement attributions. The set of program viewing proportions 350 (i.e., the program viewing proportions $p_{i,k}$ or the selling title viewing proportions $P_{i,k}$) are determined by the viewing proportion estimation model 310 based on the historical viewing data 140 and the planned advertising campaign details 160, as discussed above with respect to the method 200.

In addition, an attribution regression model 1010 is trained based on historical spot attribution data 1020 to forecast attributions. Particularly, the historical spot attribution data 1020 includes, for example, aggregated behavioral results that are correlated to advertisement spot airings. As one example, a certain measured increase in web site visits over the normal traffic volume can be correlated with an advertisement spot that aired on national television within a certain number of minutes prior to the increase. FIG. 20A shows a table of exemplary historical spot attribution data 1020 which correlates a measured lift in site visits with an advertisement spot that aired at a respective airing date/time on a respective television network.

In order to train the attribution regression model 1010, the processor 112 associates historical measured audience volume and audience composition data with each historical advertisement spot airing in the historical spot attribution data 1020. Audience composition measures include, for example, audience proportions by age and gender ranges, income ranges, education levels, etc. In one embodiment, the processor 112 derives the historical audience volume and audience composition data from, for example, the historical viewing data 140. FIG. 20B shows a table of exemplary audience volume and audience composition data 1030 mapped onto the individual advertisement spot airings included in the historical spot attribution data 1020.

The processor 112 trains the attribution regression model 1010 by performing a regression of the historical spot attribution data 1020 with the audience volume and audience composition data associated therewith. In particular, the attribution regression model 1010 is trained as function that outputs an estimated attribution lift (e.g., in site visits or some other behavior) as a function of the composition of the exposed audience and other factors like time of day and day of week. In other words, the trained attribution regression model 1010 takes the form: Attribution Lift=f(Audience Volume, Audience Composition, Day of Week, Time of Day, . . . ).

In some embodiments, the historical spot attribution data 1020 may further include attribution data that is measured at the viewer level. Generally, this would involve following individuals that were exposed to advertisement spots and then took a certain action within a certain date range, such as visiting a store with a few days. As another example, tune-in attribution could be tracked in which viewers that are exposed to an advertisement spot for a future program subsequently end up watching that program. Attributions at the individual level are aggregated and measured as a lift over a baseline propensity for that viewer to perform the measured behavior. FIG. 20C shows a table of exemplary historical spot attribution data 1020 which includes viewer-level attribution information in which the lift in conversions over a baseline propensity due to advertisement exposures is correlated with viewer attributes include gender, age, and income. Thus, in such embodiments, the processor 112 trains the attribution regression model 1010 to model the lift in conversions over the baseline expected conversions as a further function of the viewer attributes like age, gender, income, etc.

Returning to FIG. 19, the processor 112 determines an expected audience composition and volume 1040 for the future programs of the planned advertising campaign based on the set of program viewing proportions 350 and the planned advertising campaign details 160. The expected audience composition and volume 1040 is in a form similar to the exemplary audience volume and audience composition data 1030. Finally, the processor 112 determines and estimated program attribution rate and volume 1050, using the attribution regression model 1010 and based on expected audience composition and volume 1040 for the planned advertising campaign. In particular, the processor 112 determines the expected lift (e.g., in site visits) generated by advertisement spots airing in the future programs of the planned advertising campaign based on the expected audience composition of those future airings. In at least one embodiment, the expected lift is represented as a total number of expected additional conversion volume (over a baseline). FIG. 20D shows a table of exemplary output data 1060 indicating estimated additional conversions for target future program airings of a particular selling title. Additionally, in some embodiments, the processor 112 further determines an estimated cost per attribution for each potential advertisement spot placement, based on the estimated additional conversions and the cost of the programming bucket within which the potential advertisement spot is placed.

Embodiments within the scope of the disclosure may also include non-transitory computer-readable storage media or machine-readable medium for carrying or having computer-executable instructions (also referred to as program instructions) or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for forecasting advertisement exposure, the method comprising:
   receiving, with a processor, information detailing a plurality of future linear media programs and information detailing a plurality of advertisement spots to be aired during the plurality of future linear media programs;
   determining, with the processor, for each respective viewer of a plurality of viewers, a respective plurality of predicted proportions of the plurality of future linear media programs that will be viewed by the respective viewer, using at least one machine learning model and based on the information detailing the plurality of future linear media programs;
   determining, with the processor, for each respective viewer of the plurality of viewers, whether the respective viewer will be exposed to at least one of the plurality of advertisement spots based on (i) the respective plurality of predicted proportions and (ii) the information detailing the plurality of advertisement spots; and
   training the at least one machine learning model based on historical viewing activity data for the plurality of viewers, the historical viewing activity data including (i) information detailing a plurality of historical linear media programs and (ii) a plurality of observed proportions of the plurality of historical linear media programs that were viewed by the plurality of viewers, parameters of the at least one machine learning model being optimized in an iterative manner based on errors between the plurality of observed proportions and outputs of the at least one machine learning model.

2. The method of claim 1 further comprising:
   determining, with the processor, a number of times the respective viewer will be exposed to at least one of the plurality of advertisement spots based on (i) the respective plurality of predicted proportions and (ii) the information detailing the plurality of advertisement spots.

3. The method of claim 1, the training the at least one machine learning model further comprising:
   determining a plurality of historical program feature vectors based on the information detailing the plurality of historical linear media programs, each of the plurality of historical program feature vectors including values for a plurality of program attributes for a respective historical linear media program from the plurality of historical linear media programs; and
   training the at least one machine learning model using the plurality of historical program feature vectors and the plurality of observed proportions of the plurality of historical linear media programs.

4. The method of claim 3, wherein the plurality of program attributes include at least one of (i) a category, (ii) a genre, (iii) a content identifier, and (iv) an airing time.

5. The method of claim 3, the training the at least one machine learning model further comprising:
   determining a plurality of viewing feature vectors based on (i) the information detailing the plurality of historical linear media programs and (ii) the plurality of observed proportions of the plurality of historical linear media programs, each of the plurality of viewing feature vectors including, for each respective program attribute in the plurality of program attributes, a respective observed proportion of historical linear media programs from the plurality of historical linear media programs having the respective program attribute that were viewed by the plurality of viewers; and
   training the at least one machine learning model using the plurality of historical program feature vectors and the plurality of viewing feature vectors.

6. The method of claim 3, the determining the respective plurality of predicted proportions further comprising:
   determining a plurality of future program feature vectors based on the information detailing the plurality of future linear media programs, each of the plurality of future program feature vectors including values for the plurality of program attributes for a respective future linear media program from the plurality of future linear media programs; and determining the respective plurality of predicted proportions of the plurality of future linear media programs that will be viewed by the respective viewer, using the at least one machine learning model and based on the plurality of future program feature vectors.

7. The method of claim 1, the determining the respective plurality of predicted proportions further comprising:

determining the respective plurality of predicted proportions of the plurality of future linear media programs depending on a time period between (i) airing dates of the plurality of future linear media programs and (ii) airing dates of the plurality of historical linear media programs.

8. The method of claim 7, the training the at least one machine learning model further comprising:

sampling the historical viewing activity data for plurality of distinct time periods between (i) airing dates of sampled historical linear media programs of the plurality of historical linear media programs and (ii) dates of sampled observed proportions from the plurality of observed proportions; and training the at least one machine learning model using the sampled historical viewing activity data for the plurality of distinct time periods.

9. The method of claim 1, wherein the at least one machine learning model is a plurality of machine learning models that includes a unique model for each respective viewer of the plurality of viewers.

10. The method of claim 1, further comprising at least one of:

determining, with the processor, a number of viewers in the plurality of viewers that will be exposed to at least one of the plurality of advertisement spots based on (i) the respective plurality of predicted proportions for each of the plurality of viewers and (ii) the information detailing the plurality of advertisement spots; and determining, with the processor, an average number of times each of the plurality of viewers will be exposed to at least one of the plurality of advertisement spots based on (i) the respective plurality of predicted proportions for each of the plurality of viewers and (ii) the information detailing the plurality of advertisement spots.

11. The method of claim 1, further comprising at least one of:

identifying, with the processor, at least one viewer in the plurality of viewers that will be exposed to the plurality of advertisement spots greater than a first threshold number of times during a predefined time period; and identifying, with the processor, at least one viewer in the plurality of viewers that will be exposed to the plurality of advertisement spots less than a second threshold number of times during the predefined time period.

12. The method of claim 1 further comprising:

determining, with the processor, an overlap proportion matrix having values indicating an overlap of viewers of the plurality of viewers predicted to view each future linear media program of the plurality of future linear media programs within which an advertisement spot can be aired.

13. The method of claim 12 further comprising:

determining, with the processor, an optimized media schedule identifying which future linear media programs of the plurality of future linear media programs within which an advertisement spot should be aired to optimize a predetermined goal, based on the overlap proportion matrix.

14. The method of claim 1 further comprising:

determining, with the processor, an expected audience composition and volume, based on (i) the respective plurality of predicted proportions for each of the plurality of viewers and (ii) the information detailing the plurality of advertisement spots.

15. The method of claim 14 further comprising:

determining, with the processor, an expected number of viewers that will perform a defined activity as a result of viewing one of the plurality of advertisement spots, based on the expected audience composition and volume.

16. The method of claim 15, the determining the expected number of viewers that will perform the defined activity further comprising:

determining, with the processor, the expected number of viewers that will perform the defined activity using a further model, wherein the further model is trained using historical data that correlates advertisement spots with a measured lift in performance of the defined activity.

17. The method of claim 1, wherein the plurality of future linear media programs are grouped into a plurality of groups of future linear media programs, the method further comprising:

determining, with the processor, a respective predicted proportion of each respective group future linear media programs in the plurality of groups of future linear media programs that will be viewed by the respective viewer, using the at least one machine learning model and based on the information detailing the plurality of future linear media programs.

18. The method of claim 1 further comprising:

determining at least one recommended adjustment to a schedule or a placement of the plurality of advertisement spots to be aired.

19. The method of claim 1 further comprising:

providing exposure forecast information to a remote client device via at least one of a web-interface, a file-sharing service, or email service, the exposure forecast information including the determination, for each respective viewer of the plurality of viewers, whether the respective viewer will be exposed to at least one of the plurality of advertisement spots.

* * * * *